US011537896B2

(12) United States Patent
Choi et al.

(10) Patent No.: US 11,537,896 B2
(45) Date of Patent: Dec. 27, 2022

(54) MACHINE LEARNING TECHNIQUES FOR PRECISE POSITION DETERMINATION

(71) Applicant: Intel Corporation, Santa Clara, CA (US)

(72) Inventors: Jeongsik Choi, San Jose, CA (US); Venkatesan Nallampatti Ekambaram, Hillsboro, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 16/424,945

(22) Filed: May 29, 2019

(65) Prior Publication Data

US 2019/0362237 A1 Nov. 28, 2019

Related U.S. Application Data

(60) Provisional application No. 62/818,869, filed on Mar. 15, 2019.

(51) Int. Cl.
| | |
|---|---|
| *G06N 3/08* | (2006.01) |
| *G06N 3/04* | (2006.01) |
| *G01S 5/02* | (2010.01) |
| *G01S 5/14* | (2006.01) |
| *H04W 24/08* | (2009.01) |
| *H04B 7/06* | (2006.01) |

(52) U.S. Cl.
CPC ............ *G06N 3/084* (2013.01); *G01S 5/0278* (2013.01); *G01S 5/14* (2013.01); *G06N 3/04* (2013.01); *H04B 7/0626* (2013.01); *H04W 24/08* (2013.01)

(58) Field of Classification Search
CPC .......... G01S 5/14; G01S 5/0244; G01S 11/02; G01S 5/0278; G01S 2205/02; G01S 5/0242; G01S 1/042; G01S 1/68; G01S 5/0294; G06N 3/04; G06N 3/0481; G06N 3/0445; G06N 3/084; G06N 3/088; G06N 3/0454; H04B 7/0626; H04B 17/27; H04W 24/08; H04W 4/02; H04W 4/21; H04W 4/029
See application file for complete search history.

(56) References Cited

U.S. PATENT DOCUMENTS

| | | | |
|---|---|---|---|
| 8,350,758 B1* | 1/2013 | Parvizi | G01S 5/0252 342/464 |
| 2005/0136845 A1* | 6/2005 | Masuoka | G01S 1/042 455/67.14 |
| 2013/0165144 A1* | 6/2013 | Ziskind | H04W 4/02 455/456.1 |

(Continued)

*Primary Examiner* — Jung Liu
(74) *Attorney, Agent, or Firm* — KDB Firm PLLC

(57) ABSTRACT

Systems, methods, computer program products, and apparatuses to determine, by a neural network based on training data related to wireless signals exchanged by a device and a plurality of wireless access points in an environment, a respective distance between the device and each wireless access point, receive location data related to a respective location of each wireless access point of the plurality of wireless access points, determine a geometric cost of the neural network based on a geometric cost function, the respective distances, and the received location data, and train a plurality of values of the neural network based on a backpropagation and the determined geometric cost.

17 Claims, 12 Drawing Sheets

(56) References Cited

U.S. PATENT DOCUMENTS

| | | | | |
|---|---|---|---|---|
| 2014/0329540 A1* | 11/2014 | Duggan | ............... | H04W 4/029 |
| | | | | 455/456.1 |
| 2016/0269871 A1* | 9/2016 | Huber | ................ | H04L 63/0876 |
| 2020/0191943 A1* | 6/2020 | Wu | ...................... | G01S 13/726 |

* cited by examiner

MACHINE LEARNING TECHNIQUES FOR PRECISE POSITION DETERMINATION

CROSS-REFERENCE TO RELATED APPLICATIONS

This application claims the benefit of U.S. Provisional Application No. 62/818,869 filed Mar. 15, 2019. The aforementioned provisional application is incorporated by reference herein in its entirety.

BACKGROUND

Conventional approaches to determining the location of devices include trilateration techniques, such as Global Positioning System (GPS) trilateration. However, conventional techniques suffer from drawbacks. For example, GPS (or other satellite-based systems) do not cover all areas on Earth, as the paths from GPS satellites may be blocked by buildings or other obstacles (e.g., irregular terrain, vehicles, trees, human bodies, etc.). As another example, water or other substances may reflect signals and do not provide accurate distances to the satellites. Furthermore, GPS is rarely available in indoor environments, as outer walls of structures may block the GPS signals. Additionally, in indoor environments, conventional techniques fail to provide accurate distances of devices because the propagation characteristics of wireless signals change according to the environment. Thus, it is difficult to accurately determine distances without knowing the exact characteristics of the propagation channels.

DETAILED DESCRIPTION

Figure 1:
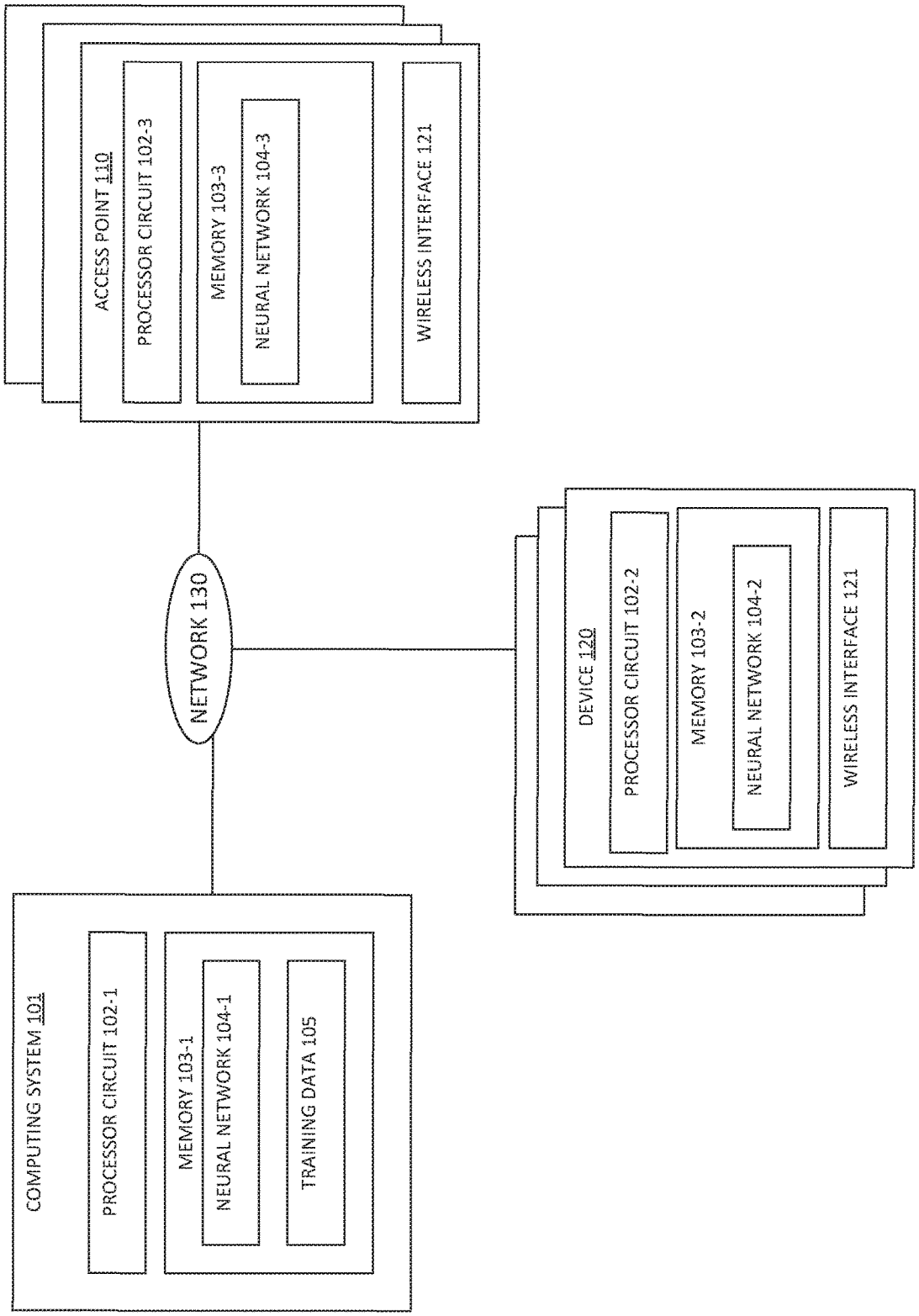
FIG. 1 illustrates an embodiment of a system.

Embodiments disclosed herein provide machine learning techniques for trilateration-based positioning, which may estimate the location of a device (e.g., a drone, a vehicle, a mobile phone, a mobile device, etc.) using three or more nearby anchor nodes (e.g., wireless access points (APs)) whose locations are known. More specifically, embodiments disclosed herein estimate distances from access points to a device and determine the location of the device based at least in part on the estimated distances.

Using machine learning, embodiments disclosed herein may efficiently learn the characteristics of any environment (e.g., a floor of an office building, a room, one or more portions of an airport, etc.) using training data related to wireless signals propagated in the environment by devices and/or access points. In addition, embodiments disclosed herein leverage unsupervised (or semi-supervised) learning techniques, which significantly reduce human intervention for collecting training data. For instance, rather than receiving human-generated training data, embodiments disclosed herein may fly drones in areas where the propagation characteristics are desired. Similarly, user-carried devices may periodically report data that can used as training data. Using the training data, the machine learning techniques intelligently determine the characteristics of the environment and learn an optimal strategy to estimate distance from access points.

The machine learning framework disclosed herein identifies the surrounding environment of a given location and accurately estimates the distance from each access point using a neural network (NN). At the same time, the NN also produces the reliability (or confidence level) of any estimated distances. Embodiments disclosed herein may then determine the location of the device using the outputs of the NN. Furthermore, by extending this technique, embodiments disclosed herein provide semi-supervised learning techniques to estimate biases of each access point and/or device, and to estimate the location of an access point.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a system 100. As shown, the system 100 includes one or more computing systems 101, one or more wireless access points 110, and one or more devices 120 connected via a network 130. The computing system 101 may be any type of computing system, such as a server, workstation, laptop, mobile device, or virtualized computing system. For example, the computing system 101 be an embedded system such as a deep learning accelerator card, a processor with deep learning acceleration, a neural compute stick, or the like. In some examples, the computing system 101 comprises a System on a Chip (SoC) and, in other embodiments, the computing system 101 includes a printed circuit board or a chip package with two or more discrete components.

The access points 110 are representative of any type of device configured to provide wireless network connections to the computing system 101 and/or the devices 120. Example access points 110 include wireless routers, switches, cellular base stations (BSs), Wi-Fi access points (APs), and Bluetooth APs, and the like. The access points 110 may implement one or more versions of the Institute of Electrical and Electronics Engineers (IEEE) 802.11 protocol to communicate via a wireless interface 121. The devices 120 are representative of any type of device including a wireless interface 121. Examples of the devices 120 include, without limitation, drones, unmanned aerial vehicles, vehicles, robots, mobile devices, smartphones, tablet computers, laptop computers, wearable devices, and the like. Examples of the wireless interfaces 121 include wireless local area network (WLAN) adapters configured to communicate according to the IEEE 802.11 protocol, Bluetooth adapters, and the like. As shown, the computing system 101, devices 120, and access points 110, include a processor circuit 102-1, 102-2, and 102-3, respectively and a memory 103-1, 103-2, and 103-3, respectively. The processor circuits 102-1, 102-2, and 102-3 (collectively referred to as processor circuits 102) are representative of any type of computer processor. The memory 103-1, 103-2, and 103-3 (collectively referred to as the memory 103) representative of any type of computer-readable and/or writeable memory.

As shown, the memory 103-1 of the computing system 101 includes a neural network 104-1. Similarly, the memory 103-2 of the device 120 may include an instance of the neural network 104-2, while the memory 103-3 of the access points 110 may include an instance of the neural network 104-3. The neural networks 104-1, 104-2, and 104-3 may collectively be referred to as the neural networks 104. Generally, a neural network implements dynamic programming to determine and solve for an approximated value function. Although depicted as being stored in a memory 103, the neural networks 104 are representative of software, hardware, and/or a combination of software and hardware. The neural networks 104 are representative of any type of neural network. For example, the neural networks 104 may be recurrent neural networks, deep neural networks, convolutional neural networks, and the like. Furthermore, the neural networks 104 are representative of other types of learning structures, such as machine learning models, and the use of a neural network 104 as a reference example is not limiting of the disclosure.

The neural networks 104 may include an input layer, an output layer, and one or more hidden layers. Generally, a neural network includes two processing phases, a training phase and an inference phase. During the training process, a deep learning expert may architect the network, establishing the number of layers in the neural network, the operation performed by each layer, and the connectivity between layers. The layers may have parameters, typically weights, that determine exact computation performed by the layer. The weights may also include a weight for each connection between two neurons. The objective of the training process is to learn the weights, usually via a stochastic gradient descent-based excursion through the space of weights. The training of a neural network 104 may be based on training data, e.g., the training data 105 of the computing system 101. Although depicted as being stored by the computing system 101, the devices 120 and/or the access points 110 may train an instance of a neural network 104 using a respective instance of training data 105. The training data 105 may generally include data from devices 120 and/or APs 110 collected in a given environment. For example, the training data 105 may include data describing attributes of wireless signals propagated by the devices 120 and/or the access points 110. The attributes of the wireless signals include, but are not limited to, received signal strength (RSS), channel state information (CSI), round-trip time (RTT) of wireless signals, and the like. More generally, data related to any attribute of a wireless signal and/or any attribute derived therefrom may be included in the training data 105. Similarly, the training data 105 may include estimated locations of a given device 120.

Advantageously, the neural networks 104 may be trained using the training data 105 via unsupervised and/or semi-supervised training techniques. For example, in unsupervised learning techniques, the neural networks 104 may be trained without requiring ground truth labels indicating the actual locations of the devices 120 and/or the actual distances between a given AP 110 and a given device 120 applied to the training data 105. Generally, the neural networks 104 may be trained using one or more cost functions, such as a geometric cost function, a difference cost function, a velocity cost function, and a distance cost function. In one embodiment, to collect the training data 105, multiple drones, robots, mobile phones, and/or other devices 120 may navigate a given environment to collect training data 105 which may be reported back to the computing system 101 and/or the access points 110. For example, data describing the wireless signals exchanged between the drones, robots, phones, devices 120 and access points 110 may be collected and used as training data 105. Each element of data describing the wireless signals may be associated with a time interval (e.g., the training data 105 may be collected over a plurality of time intervals, such as 1 millisecond time intervals, 1 second time intervals, etc.).

More generally, during training, the neural networks 104 may learn the characteristics of a given environment to allow the neural networks 104 to compute an estimated distance between a given device 120 and one or more access points 110. Furthermore, the neural networks 104 may compute a confidence value (or reliability value) reflecting a level of confidence and/or reliability in the computed distances. In some embodiments, the degree of confidence and/or reliability may be a standard deviation value. Using the computed distances and confidence values, the neural networks 104 may subsequently compute a location of the devices 120 in the environment. Furthermore, in some embodiments, a semi-supervised learning technique may be applied to learn biases of a given AP 110 and/or device 120 learned during training of the neural network 104. Further still, in some embodiments, a semi-supervised learning technique may be applied to train the neural network 104 to estimate the locations of the APs 110.

A given instance of a neural network 104 may correspond to one or more locations (or environments). Therefore, an instance of the neural network 104 may be trained to determine the physical characteristics of the location and any attributes of wireless channels propagated in the location. The neural networks 104 may estimate the distance of a device 120 to a nearby AP 110, determine an accuracy of each estimated distance, and/or estimate the offset of a given device and/or a given AP 110. The neural networks 104 may further determine device 120 locations and/or AP 110 locations using trilateration techniques. One or more cost functions may be defined to evaluate the accuracy of the neural network 104. Furthermore, different trainable variables may be assigned to each AP 110 and/or device 120 to compensate for their offsets (e.g., based on physical characteristics of each AP 110 and/or device 120). These variables may be optimized during training.

Figure 2:
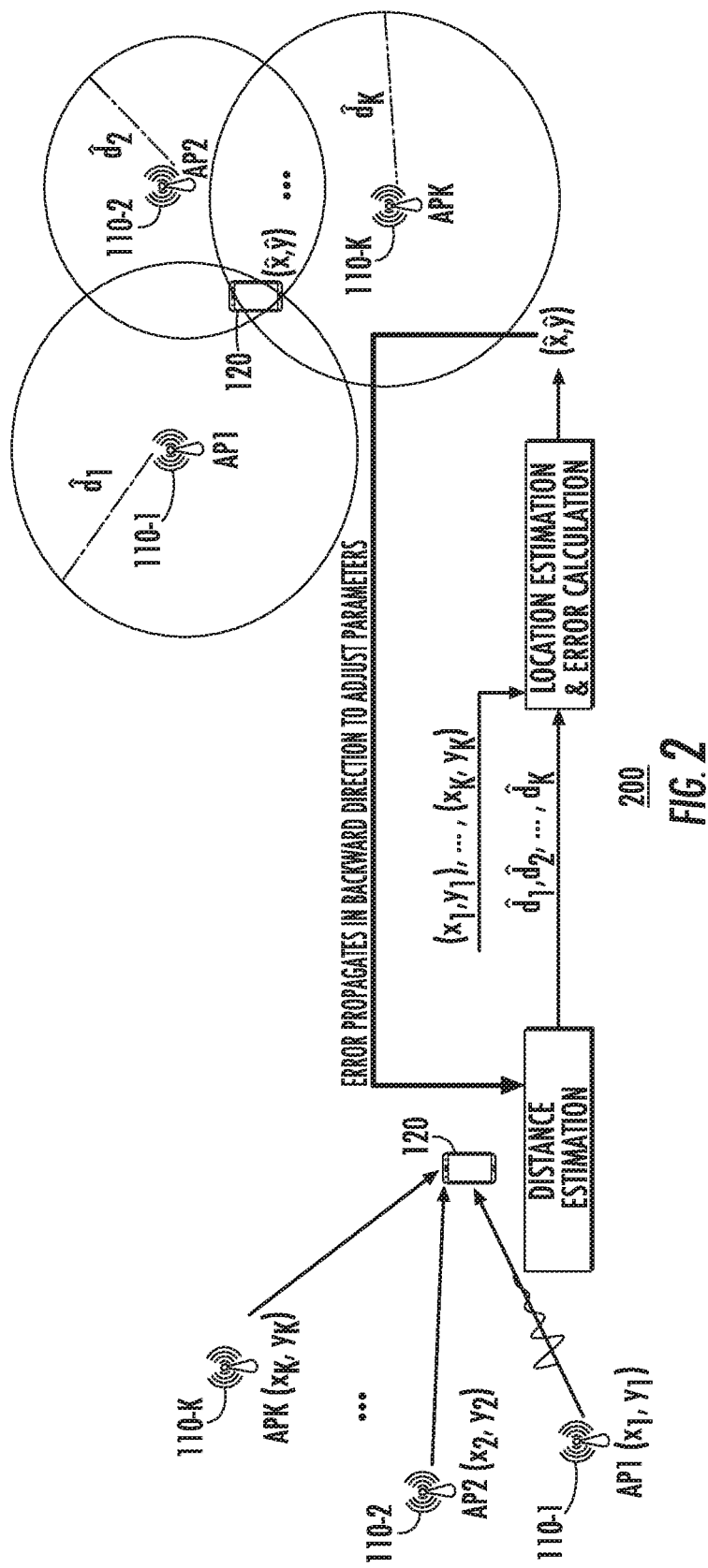
FIG. 2 illustrates an embodiment of precisely determining the position of devices using machine learning.

FIG. 2 is a schematic 200 illustrating an overview of training a neural network 104 according to various embodiments. Generally, the left side of the schematic illustrates the estimation of the distances between a device 120 and one or more nearby APs 110-1, 110-2, and 110-K (where K is a positive integer) using an instance of the neural network 104. In addition, the output of the neural network 104 may include a reliability of each estimated distance between the device 120 and the APs 110. The neural network 104 may then determine the location of a device 120 based on the estimated distances between the device 120 and the APs 110. Generally, the estimated location of the device 120 may be based on any estimation technique, such as an extended Kalman filter, a linear least-square method, a weighted linear least-square method, and/or 802.11-based estimation techniques. Once the location of the device is determined, a cost function may be defined to train the neural network 104 using unsupervised learning. Generally, during the training, the error propagates backward to adjust (or refine) the parameters of the neural network 104.

A neural network 104 can take any information that can be represented by a vector as input. For example, RSS values in the training data 105 may be provided as input to the neural network 104. In such an example, the input layer of the neural network 104 may be x=RSS. If RSS from multiple frequency bands (e.g., 2.4 GHz and 5 GHz) is used, then the input layer may be expressed by the following Equation 1:

$$x=[RSS_{2.4\ GHz}, \ldots, RSS_{5\ GHz}]^T \qquad \text{Equation 1}$$

In Equation 1, x is a vector including RSS values for 2.4 GHz and 5 GHz frequency bands, and "T" is the transpose operation. Additionally and/or alternatively, the input to the neural network 104 may include other information, such as CSI. In such an example, the input layer may be expressed by the following Equation 2:

$$x=[RSS,\text{real}(H(f_1)),\text{imag}(H(f_1)), \ldots, \text{real}(H(f_p)),\text{imag}(H(f_p))]^T \qquad \text{Equation 2}$$

In Equation 2, real(•) and imag(•) represent the real and imaginary parts of a complex number, $H(f_p)$ represents the p-th CSI value, and P is the number of pilots. If other information like RSS, CSI from multiple antennas, channel delay profile, angle of arrival (AoA), FTM measurement is available in the training data 105, the input layer of the neural network 104 may be formed by concatenating these values.

Regardless of the type of the input layer, the neural network 104 produces, as output, estimated distances from a device 120 to one or more access points 110 and the reliability of each estimated distance. In one embodiment, the neural network 104 produces estimated distances from a device 120 to at least three different access points 110. In an example multi-layer neural network 104, the estimated distance may be expressed by $d=h_\theta(x)$, where $\theta$ represents every parameter in the neural network 104. In some embodiments, the neural network 104 may be a recurrent neural network (RNN), which produces an output based not only on the current input but also on several previous inputs. In such an example, the output at time interval t can be represented by Equation 3:

$$\hat{d}(t)=h_\theta(x(1) \ldots ,x(t)) \qquad \text{Equation 3}$$

In Equation 3, the index t indicates the time interval. No matter which neural network 104 framework is used, the structure is applied to estimate distance from multiple APs 110, so sub-scripts may be added to indicate the index of AP (e.g., $\hat{d}_1, \hat{d}_2, \ldots, \hat{d}_K$). In a similar way, the neural network 104 may produce an output which is the confidence and/or reliability of any estimated distance. The reliability may be denoted as $\hat{r}_k(t)$ for the estimated distance for the device 120 to AP k at time interval t.

Unsupervised learning does not require actual distances from each AP 110 to a given device 120 in the training data 105 as ground truths. Therefore, in such examples, the output of the neural network 104 cannot be compared with ground truth data during training. However, using unsupervised learning, the accuracy of the neural network 104 may be inferred using from geometry. No matter how well the neural network 104 is trained, the neural network 104 produces outputs depending on the parameters.

Figure 3:
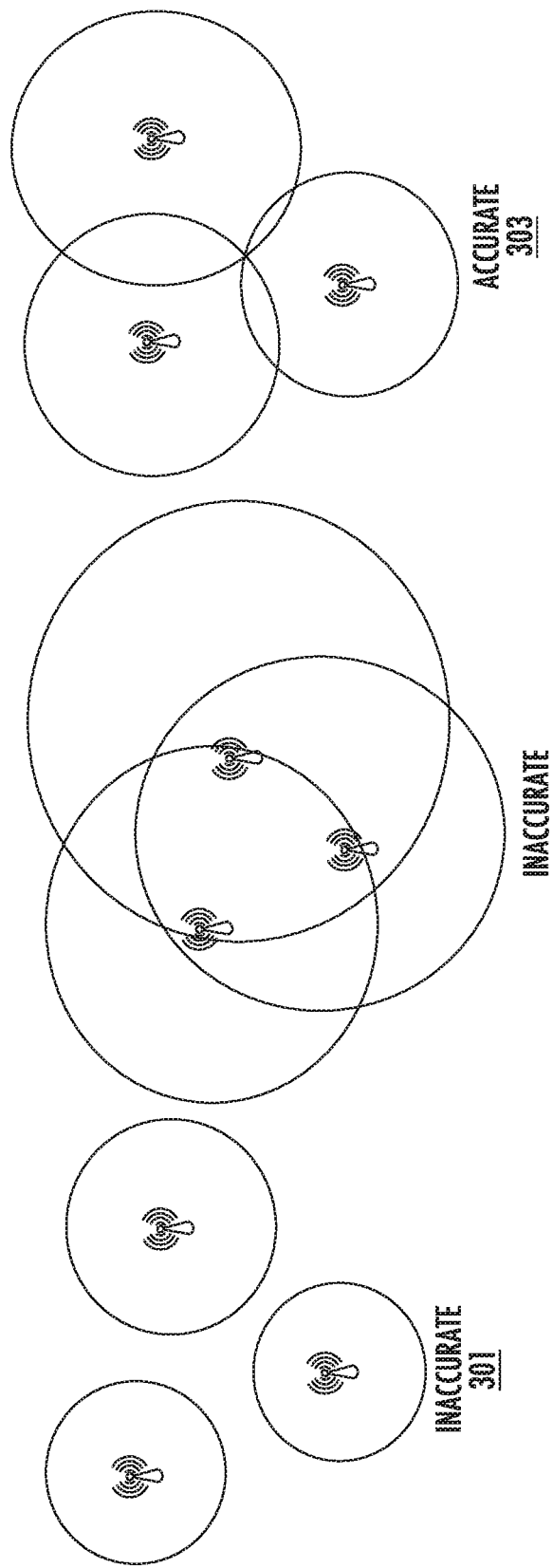
FIG. 3 illustrates an embodiment of unsupervised learning techniques to train a machine learning model to precisely determine the position of devices.

FIG. 3 is a schematic 300 illustrating estimated distances from three APs to a device (not pictured). In the "inaccurate" estimations 301 and 302, the circles do not intersect at a single point. Therefore, even though the location of a device may be estimated using these estimations, the distance estimation may not be accurate. However, the "accurate" estimation 303 includes an intersection at a single point. Even though the single point does not guarantee the true location of device 120, the estimation 303 may be more accurate than the other two estimations 301, 302.

Therefore, embodiments disclosed herein may leverage a cost function that indirectly informs about the accuracy of the neural network 104 based on geometry. Such a cost function may be referred to as a geometric cost function. In such an example $(\hat{x},\hat{y})$ may correspond to the estimated location (e.g., (x,y) coordinates) of the device 120 generated by the neural network 104. The geometric cost at time interval t can be determined from the known location of one or more access points 110 and the estimated distances/reliability from these access points 110 may be determined using Equation 4, which adds the time interval index t:

$$J_{geo}(t)=f(x_1(t),y_1(t),\hat{d}_1(t),\hat{r}_1(t), \ldots, x_K(t),y_K(t),\hat{d}_K(t),\hat{r}_K(t)) \qquad \text{Equation 4.}$$

Examples of the geometric cost function include Equation 5:

$$J_{geo}(t) = \sum_{k=1}^{K} \left( \sqrt{(\hat{x}(t) - x_k(t))^2 + (\hat{y}(t) - y_k(t))^2} - \hat{d}_k(t) \right)^2. \quad \text{Equation 5}$$

Another example of the geometric cost function includes Equation 6:

$$J_{geo}(t) = \sum_{k=1}^{K} \hat{r}_k(t) \left( \sqrt{(\hat{x}(t) - x_k(t))^2 + (\hat{y}(t) - y_k(t))^2} - \hat{d}_k(t) \right)^2. \quad \text{Equation 6}$$

In Equations 4-6, "$J_{geo}(t)$" corresponds to the geometric cost at time interval t, "$d_K$" corresponds to the estimated distances (between a device 120 and an AP 110) generated by the neural network 104 at a given time interval t, $\hat{r}_K$ corresponds to the reliability value generated by the neural network 104 at a given time interval t, and "$x_K(t), y_K(t)$" correspond to known (x,y) coordinates of the k-th AP 110. The overall geometric cost may be defined by adding all geometric costs over time, which may be represented by Equation 7:

$$J_{geo} = \sum_{t=1}^{T} J_{geo}(t). \quad \text{Equation 7}$$

In Equation 7, "T" represents the total number of times of measurement (e.g., each time interval from 1 to "T", where "T" is a positive integer). Therefore, as shown, Equation 7 considers the sum of all geometric costs at each time interval computed according to one or more of Equations 4-6.

Additionally and/or alternatively, in some embodiments, additional costs may be considered during training of the neural network 104. For example, if the neural network 104 is trained to precisely estimate distance at the highest level of confidence, the estimated locations do not change significantly during short time intervals. Therefore, another cost, the difference cost, may be defined to compute the difference in estimated distances between consecutive time intervals. An example difference cost function is depicted in the following Equation 8:

$$J_{diff} = \sum_{t=2}^{T} (\hat{x}(t) - \hat{x}(t-1))^2 + (\hat{y}(t) - \hat{y}(t-1))^2 \quad \text{Equation 8}$$

In Equation 8, "$J_{diff}$" corresponds to the difference cost and "$\hat{x}(t)$" and "$\hat{y}(t)$" correspond to the (x,y) coordinates of a given device 120 estimated by the neural network 104 at a given time interval. Therefore, as shown, Equation 8 considers the difference between the estimated location of a device 120 generated by the neural network 104 at consecutive time intervals.

Similarly, if the location estimates generated by the neural network 104 are accurate, the velocity of a given device 120 being tracked does not change significantly during consecutive time intervals. Therefore, a velocity cost may be considered when training the neural network 104. Equation 9 is an example cost function for computing the velocity cost:

$$J_{velo} = \sum_{t=3}^{T} (\hat{v}_x(t) - \hat{v}_x(t-1))^2 + (\hat{v}_y(t) - \hat{v}_y(t-1))^2 \quad \text{Equation 9}$$

In Equation 9, "$\hat{v}_x$" and "$\hat{v}_y$" correspond to the estimated velocity of the device 120 in the (x,y) directions computed by the neural network 104. In one embodiment, $\hat{v}_x(t) = (\hat{x}(t) - \hat{x}(t-1))/dT(t)$, $\hat{v}_y(t) = (\hat{y}(t) - \hat{y}(t-1))/dT(t)$ represents the estimated velocities and dT(t) is the time between time interval t−1 and t.

In some embodiments, the devices 120 may receive an estimated distance from an access point 110 using 802.11 distance estimation techniques (e.g., 802.11 mc). In some embodiments, the training of the neural network 104 considers these estimated distances during training. The estimated distances may be associated with a distance cost defined by the distance cost function of Equation 10:

$$J_{dist}(t) = \sum_{k=1}^{K} \left( \hat{d}_k(t) - \hat{d}_{k,guide}(t) \right)^2 \quad \text{Equation 10}$$

In equation 10, $\hat{d}_{k,guide}(t)$ is the distance estimated via the access point 110 (e.g., using 802.11 techniques) at time interval t. Equation 11 defines a total cost related to the estimated distances at each time interval t:

$$J_{dist} = \sum_{t=1}^{T} J_{dist}(t) \quad \text{Equation 11}$$

In some embodiments, a total cost J for training may be defined using the cost function of Equation 12, which represents the sum of each other computed cost:

$$J = J_{geo} + J_{diff} + J_{velo} + J_{dist} \quad \text{Equation 12}$$

Therefore, during training, parameters of the neural network 104 are optimized using the total cost function of Equation 12 via unsupervised learning techniques. For example, the geometric cost, difference cost, velocity cost, and distance cost may be computed, from which the total cost may be computed. The parameters of the neural network 104 may then be refined (or updated) via a backpropagation process based at least in part on the total cost.

Figure 4:
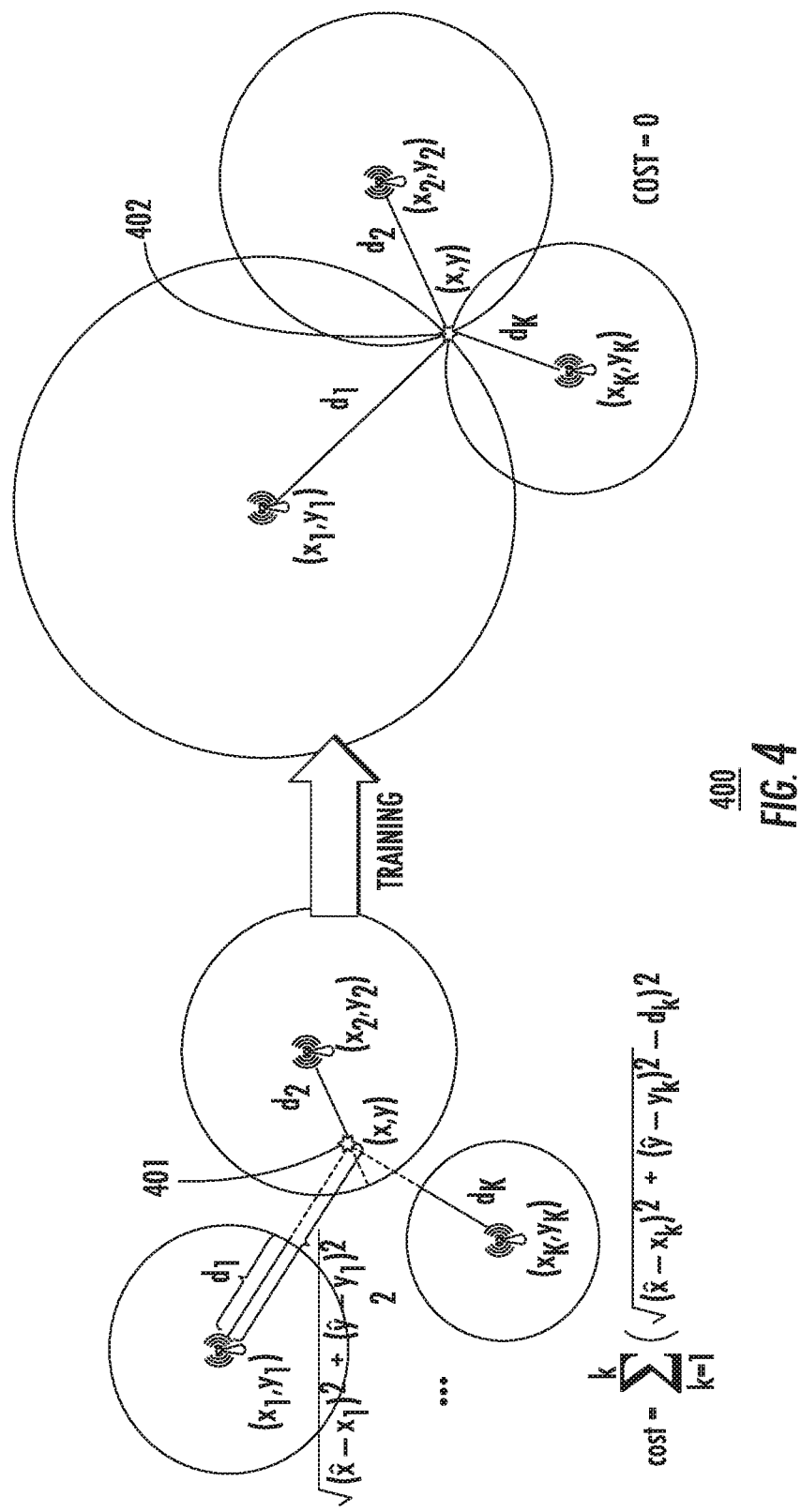
FIG. 4 illustrates an embodiment of a geometric cost function.

FIG. 4 is a schematic 400 depicting an example of determining geometric cost. Generally, as shown, before training on the left side of FIG. 4, the circles corresponding to an estimated location of a device 120 do not intersect at point 401. However, after training, the parameters of the neural network 104 are optimized make the circles on the right side of FIG. 4 intersect at single point 402.

In some embodiments, biases of a given access point 110 and/or device 120 may be considered and learned during training of the neural network 104. Possible sources of bias include radio frequency (RF) impairment, RF offset, timing offset, transmission power mismatch across APs 110, location of APs 110, and so on. To consider these effects, a trainable vector may be assigned to each AP 110 and each device 120, where each vector has dimensions equal to the input layer of the neural network 104. For instance, bias value $x_{bias,k}$ may be assigned to AP k and bias value $x_{bias,dev}$ may be assigned to a device 120. The input layer of the neural network 104 may receive the biases to allow the neural network 104 to determine estimated distance/reliability from each node. Over time, the bias values of the device 120 and/or AP 110 may be refined via training. For instance, the estimated distance from AP k can be obtained using Equation 13:

$$\hat{d}_k = h_\theta(x_k + x_{bias,k} + x_{bias,dev})  \quad \text{Equation 13}$$

In such an example, a multi-layer neural network 104 may be used. The reliability is also produced from input layers using the biases and the location of a device 120 can be computed from these outputs (e.g., using trilateration). In addition, cost functions may be defined for the multi-layer neural network 104. The reliability is also computed by the neural network 104 from input layers that consider biases and the location of device can be obtained from these outputs with estimated distance/reliability with biases and train the neural network 104 (including the bias values) using training data.

Since additional trainable variables (e.g., biases) are introduced, the neural network 104 may experience over-fitting during training. To mitigate over-fitting, a semi-supervised learning technique may be used. In such a semi-supervised technique, when training data is collected, the true location of the device 120 may be collected when the device passes some points where location data can be obtained (e.g., near poles, rooms, elevators, etc.). When the true location is available, this information may be added to the cost function so that the neural network 104 utilizes this information during training. To this end, the additional location cost function related to the known locations may be defined using Equation 14:

$$J_{loc} = \sum_{t=1}^{T} (\hat{x}(t) - \hat{x}_{guide}(t))^2 + (\hat{y}(t) - \hat{y}_{guide}(t))^2 \quad \text{Equation 14}$$

In Equation 14, $\hat{x}_{guide}(t)$, $\hat{y}_{guide}(t)$ represent the true location of the device 120 collected as part of the training data 105. If the true location is not received, the neural network 104 may assume that $\hat{x}_{guide}(t) = \hat{x}(t)$, $\hat{y}_{guide}(t) = \hat{y}(t)$. Adding this cost function to the cost function of Equation 12 provides Equation 15:

$$J = J_{geo} + J_{diff} + J_{velo} + J_{dist} + J_{loc} \quad \text{Equation 15}$$

Using the modified cost function of Equation 15, parameters and biases in the neural network 104 may be trained. Doing so allows the neural network 104 to generate more accurate location estimates of devices 120 and/or APs 110 in a given environment while accounting for the inherent, device-specific biases.

Trilateration techniques require the location of three or more access points 110 to determine the location of a device 120. However, obtaining the location of access points 110 is time-consuming. Therefore, embodiments disclosed herein may apply machine learning techniques to estimate the location of access points 110 as well.

To do so, embodiments disclosed herein estimate a coarse location of one or more APs 110 from collected training data 105. Using a semi-supervised learning approach, some portion of training data 105 contains the true location of the device 120. Given $(x(t_1), y(t_1)), \ldots, (x(t_N), y(t_N))$ as the true locations of the device 120 at time $t_1, \ldots, t_N$, and given $T_k$ representing the set of time where signals from AP k was measured at that time, the coarse location of the AP k can be computed using Equation 16:

$$(\hat{x}_k, \hat{y}_k)_{coarse} = \sum_{t \in T_k} (x(t), y(t)) \quad \text{Equation 16}$$

Otherwise, if the estimated distances from AP k are available for the time in $T_k$, the coarse location of the AP k can be obtained using trilateration techniques, e.g., 802.11 techniques. Once a coarse location of each AP 110 is determined, the true location is expressed by the sum of the coarse location and a location offset. For instance, the true location of AP k may be expressed by Equation 17:

$$(\hat{x}_k, \hat{y}_k)_{true} = (\hat{x}_k, \hat{y}_k)_{coarse} + (\Delta x_k, \Delta y_k) \quad \text{Equation 17}$$

In Equation 17, $(\Delta x_k, \Delta y_k)$ is the offset for the AP k, and elements in this offset are also trainable. In other words, the offset is optimized during training stage to estimate the fine location of each AP.

In at least one embodiment, the neural network 104 comprises one or more multi-layer perceptrons (MLPs) that have L fully-connected hidden layers, where the l-th layer ($1 \leq l \leq L$) has $D_l$ hidden nodes. The values, or activations, of the l-th layer are denoted by $a_l$, which may be computed by equation 18:

$$a_l = \sigma_l(W_l a_{l-1} + b_l) \quad \text{Equation 18}$$

In equation 18, W is a $D_l \times D_{l-1}$ weight matrix, $b_l$ is a $D_l \times 1$ bias vector, and $\sigma_l$ is an element-wise non-linear activation function. In one embodiment, to make equation 18 cover the input layer, $\sigma_l = x$.

One output of such an MLP is a distance estimate which directly comes from the activations of the last hidden layer. Since the distance is always positive, a rectified linear unit (ReLU) may be used for output activation. In other embodiments, the sigmoid function may be applied.

The reliability value of a given output (e.g., a distance) computed by the neural network 104 may be defined in terms of standard deviation. Equation 19 depicts an example equation related to the last hidden layer of the neural network 104:

$$\hat{s} = \Gamma_{std} \sigma(W^{std} a(i) + b^{dist}) \quad \text{Equation 19}$$

In equation 19, $\Gamma^{std}$ corresponds to the maximum standard deviation value, $W^{std}$ is a weight matrix, and $b^{dist}$ is a bias value.

In a recurrent neural network (RNN) embodiment, a single-layer RNN with long short-term memory (LSTM) unit may be used. The RNN produces an output based not only on the current input layer but also on the previous hidden layer which may convey information about the past input layers. The LSTM facilitates information flow between consecutive time intervals using three gates, namely forget, input, and output gates.

To compensate for offsets specific to a type of device 120 and/or a specific access point 110, the neural network 104 compensates the effect of the device and/or AP by adding offsets which have the same dimension as the input layer of the neural network 104. Once trained, the neural network 104 can be used to determine the location of a device 120 and/or AP 110 in the corresponding environment. For example, the neural network 104 may receive runtime data related to wireless signals exchanged between a device 120 and one or more APs 110. The neural network 104 may then generate an output comprising an estimated location (e.g., in (x,y) coordinates) in the environment with a corresponding reliability value. In some embodiments, as stated, the neural network 104 may generate the estimated location based at least in part on a bias of the device 120 (if a bias has been learned for that type of device) and/or the learned biases of the APs 110.

Figure 5:
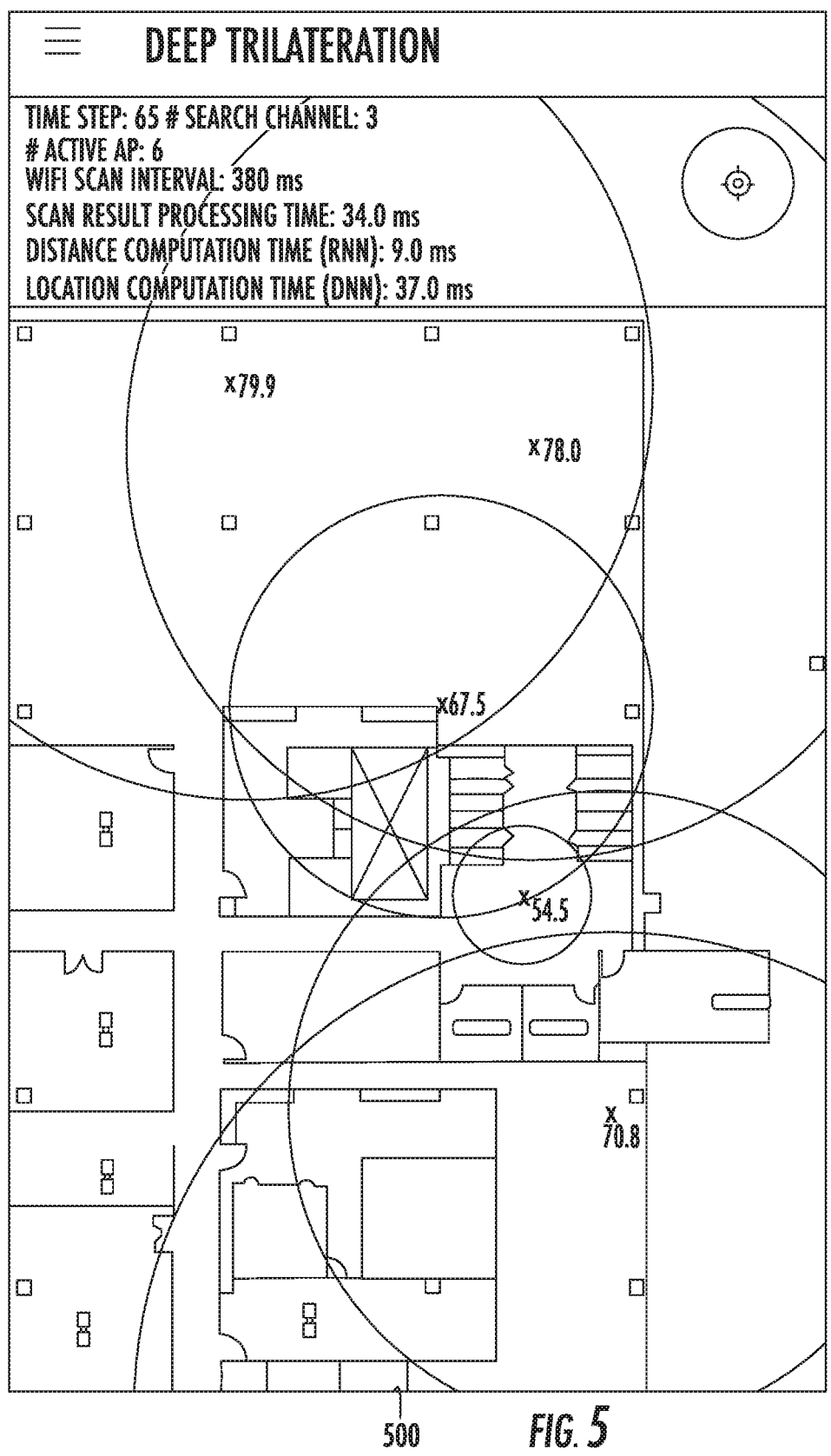
FIG. 5 illustrates an example graphical user interface of an application that depicts example device locations determined using machine learning.

FIG. 5 illustrates a graphical user interface (GUI) 500 which depicts the locations of example devices, e.g., the devices 120. In the GUI 500, the circles correspond to estimated locations of devices 120 computed by the neural network 104. Advantageously, training of the neural network 104 is an unsupervised training, meaning, in some examples, training data 105 is collected by one or more people walking around the location depicted in the GUI 500 with one or more devices 120.

As stated, characteristics of a given environment may be learned by the neural network 104, which may be used to improve the estimates generated by the neural network 104. Some of these characteristics may change slowly over time and hence can be reused by multiple devices 120 that are trying to determine their own positions. To this extent, some parameters may be exchanged between the devices 120 and the APs 110. For example, the weights of a given instance of the neural network 104 (e.g., on a device 120) may be updated over time and transmitted periodically to the APs 110 and/or the computing system 101. The receiving AP 110 stores the neural network 104 and provides the weight values to any device 120 (or 101) that requests these weights. These weights can be used as an initial point while training the neural network 104 (e.g., on a device 120, an AP 110, and/or the system 101). These parameters may be periodically broadcasted by the AP 110 as part of its beacon. In semi-supervised embodiments, the devices 120 may request any bias variables that are stored by the AP which can be used to improve location estimates. For determining positions of the APs 110, the devices 120 may report their own location to the neural network 104 of the AP 110 and/or in the computing system 101.

Figure 6:
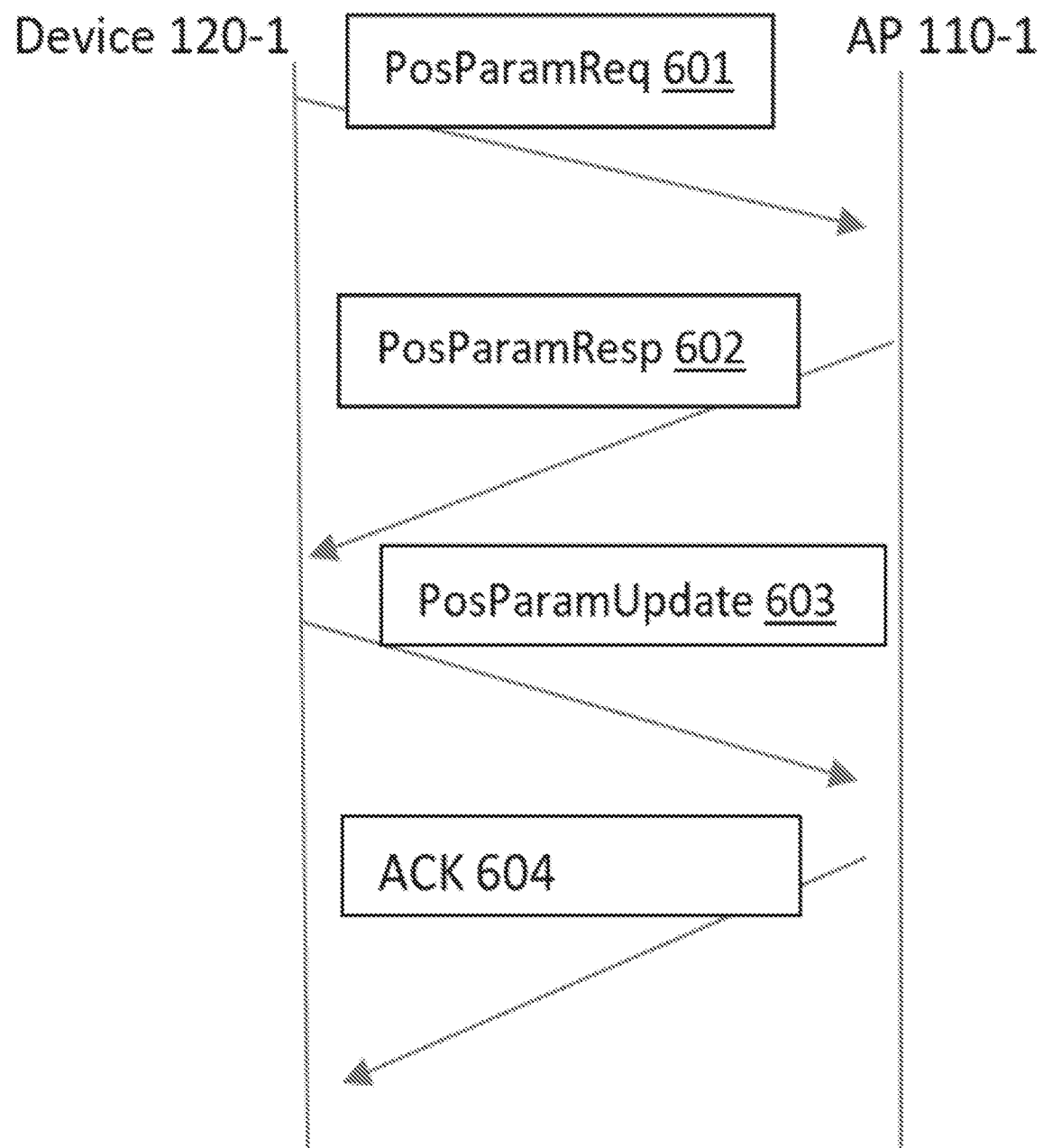
FIG. 6 illustrates an example message flow between a device and an access point.

FIG. 6 illustrates an example message flow 600 between a device 120-1 and an AP 110-1. In some embodiments, the computing system 101 may perform the same operations as the AP 110-1. As shown, in message 601, the device 120-1 requests the weights of the neural network 104, bias parameters, and AP locations from the AP 110-1. In message 602, the AP 110-1 responds with updated weights for the neural network 104, bias parameters, and estimated and/or updated AP locations. In message 603, the device 120-1 may transmit updated weights for the neural network 104, bias parameters, and estimated and/or updated AP locations to the AP 110-1. In message 604, the AP 110-1 may respond with an acknowledgment, e.g., after updating the relevant values.

Figure 7:
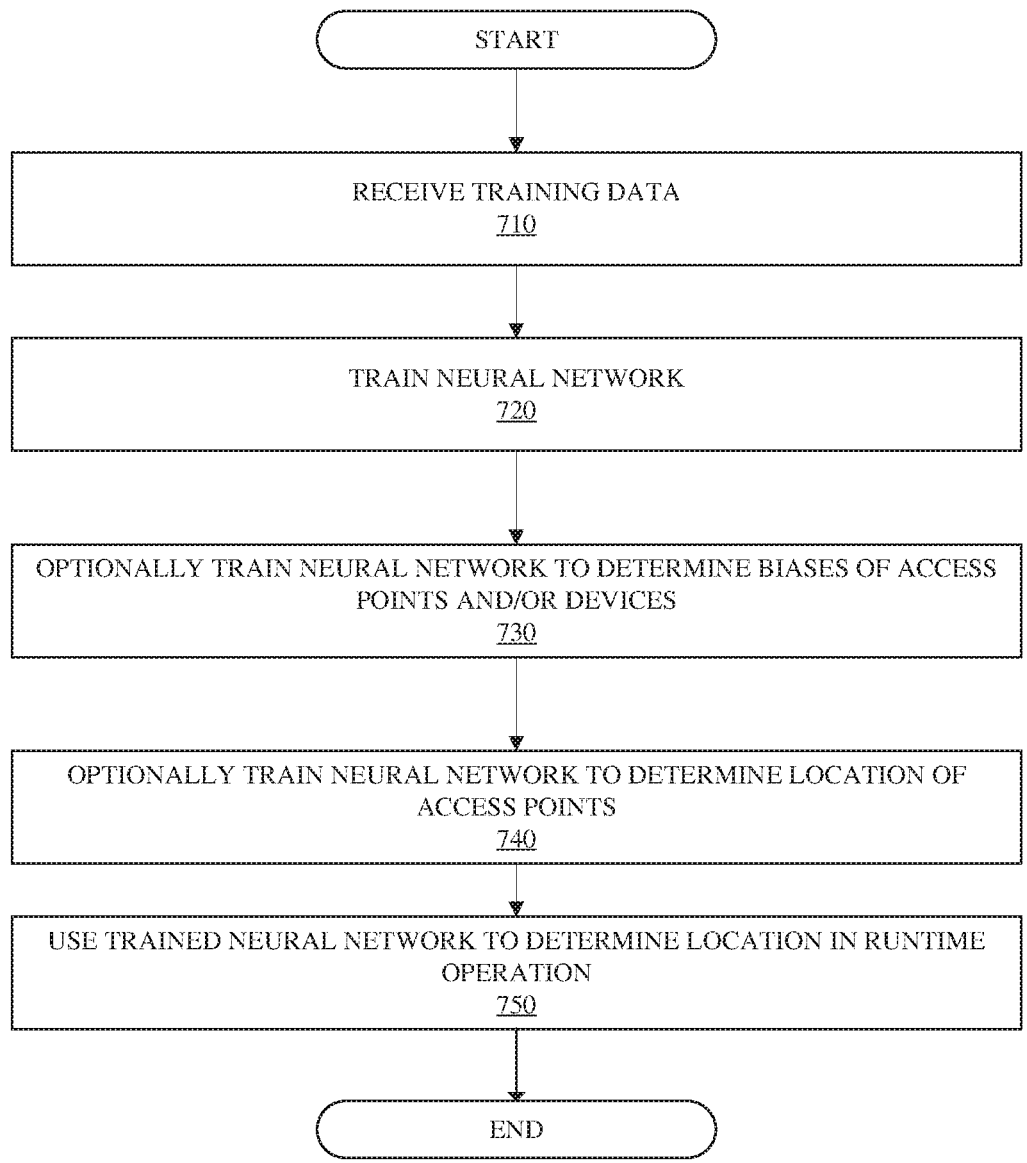
FIG. 7 illustrates an example of a first logic flow.

FIG. 7 illustrates an embodiment of a logic flow 700. The logic flow 700 may be representative of some or all of the operations executed by one or more embodiments described herein. Embodiments are not limited in this context.

As shown, the logic flow 700 begins at block 710, where training data 105 may be received. The training data 105 may be associated with an environment. The environment may be any real-world space having wireless access points 110, such as a floor of an office building (and/or a portion thereof), a room, and the like. The training data 105 may generally include data related to attributes (e.g., RSS, etc.) of wireless signals propagated by one or more devices 120 and/or the APs 110. The training data 105 may further include known locations of a device 120 and/or APs 110. As stated, the training data 105 may be collected by navigating devices 120 in the environment, devices 120 carried by users in the environment, etc. At block 720, one or more neural networks 104 are trained using the training data using unsupervised learning techniques and one or more cost functions. In some embodiments, semi-supervised learning techniques may be used to train the neural networks 104, e.g., when known location data is collected for one or more devices 120.

At block 730, the neural network 104 may be trained to learn the biases of one or more types of device 120 and/or one or more types of access point 110. As stated, the bias values may be learned during semi-supervised training techniques using bias values as input to the neural network 104. At block 740, the neural network 104 may be trained to learn the locations of one or more APs 110 using a semi-supervised training technique as described above. At block 750, the neural network 104 may determine the location of a device 120 and/or an AP 110 in the environment in a runtime operation. Generally, in such a runtime operation, the neural network 104 may receive data related to wireless signals exchanged by the device 120 and one or more APs 110 as input. Based on the input, the trained neural network 104 may determine the location of the device 120 and/or AP 110. The neural network 104 may determine a confidence and/or reliability value reflecting a degree of confidence and/or reliability of the computed location of the device 120 and/or AP 110. In some embodiments, the determined locations of devices 120 and/or APs 110 may be outputted for display on a GUI, such as the GUI 500.

Figure 8:
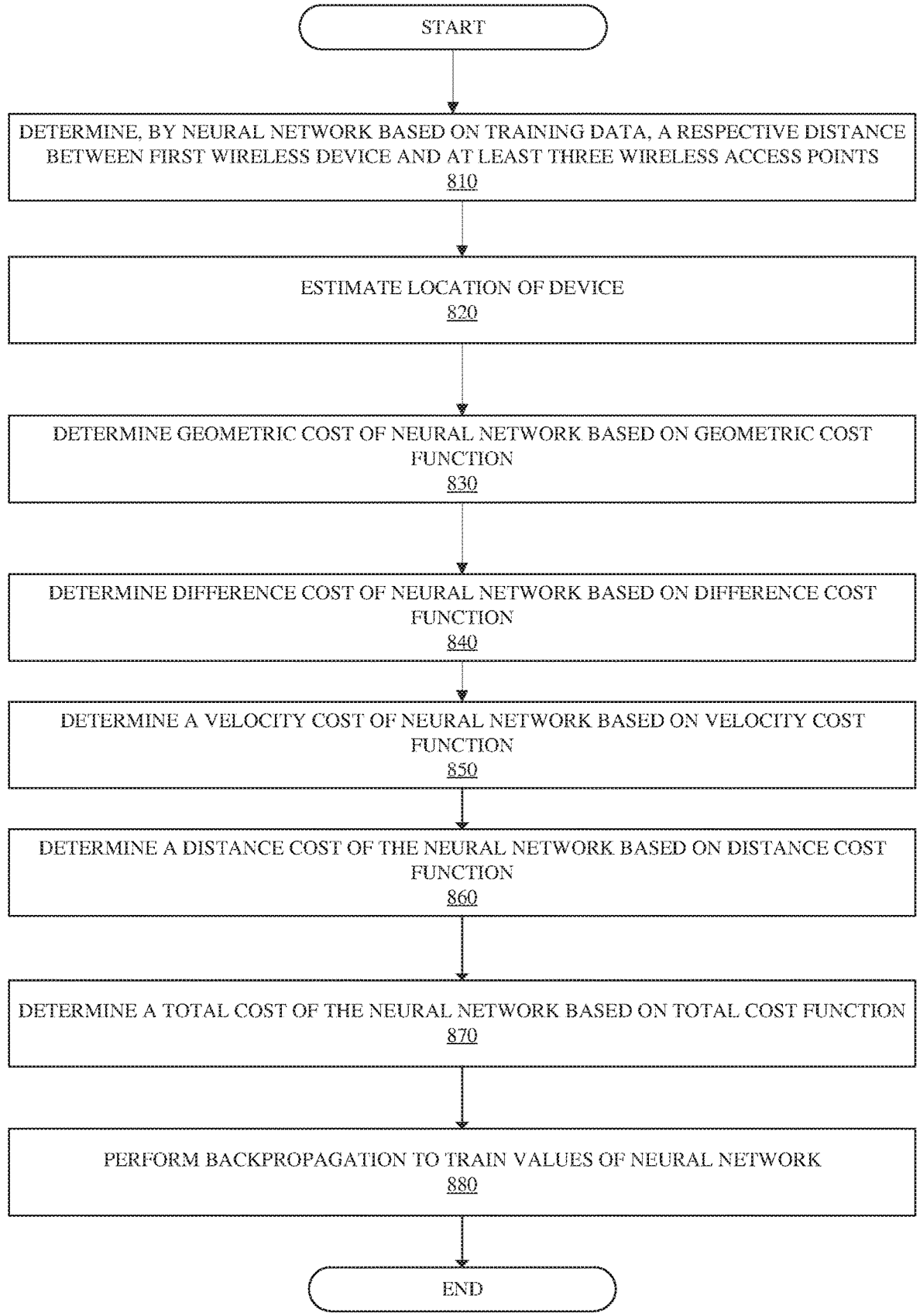
FIG. 8 illustrates an example of a second logic flow.

FIG. 8 illustrates an embodiment of a logic flow 800. The logic flow 800 may be representative of some or all of the operations executed by one or more embodiments described herein. For example, the logic flow 800 may be representative of some or all of the operations executed to train the neural network 104 using unsupervised learning. Embodiments are not limited in this context.

As shown, the logic flow 800 begins at block 810, where the neural network 104 determines a respective distance between a device 120 and a plurality of APs 110 in an environment based on training data 105 collected in the environment. In one embodiment, the plurality of APs 110 include at least three APs 110. The training data may describe wireless signals exchanged between a plurality of devices 120 and the plurality of APs 110 in the environment at a plurality of time intervals (also referred to as time steps). For example, at a first time interval, the neural network 104 may estimate that the device 120 is 3 meters from a first AP 110, 2 meters from a second AP 110, and 5 meters from a third AP 110. More generally, the neural network 104 may estimate the locations of a plurality of devices 120 relative to at least three of a plurality of APs 110 at block 820. At block 820, the neural network 104 may compute an estimated location of one or more devices 120 for one or more time intervals. The neural network 104 and/or other logic executing on a processor may compute the estimated locations using any technique, such as trilateration, 802.11 mc, etc. The neural network 104 may further produce a reliability value for each estimated location and/or distance computed at blocks 820 and 810, respectively. At block 830, a geometric cost of the neural network 104 may be determined using a geometric cost function. The geometric cost may be for one or more time intervals. Equations 4-7 above include example geometric cost functions.

At block 840, a difference cost of the neural network 104 at one or more time intervals may be computed using a difference cost function. Equation 8 above is an example of a distance cost function. At block 850, a velocity cost of the neural network 104 is determined at one or more time intervals using a velocity cost function. Equation 9 above is an example of a velocity cost function. At block 860, at least one distance cost of the neural network 104 for one or more time intervals may be computed using a distance cost function. Equations 10-11 above are examples of distance cost functions. At block 870, a total cost of the neural network 104 is computed using a total cost function. The total cost function may consider one or more of the geometric cost, the difference cost, the velocity cost, and the distance cost. Equations 12 and 15 above are examples of total cost functions. At block 880, the neural network 104 is trained using backpropagation to train parameter values of the neural network 104. The parameters values trained may include weights, biases, and/or activations of the neural network 104. Generally, the blocks of the logic flow 800 may be performed any number of times to train the neural network 104.

Figure 9:
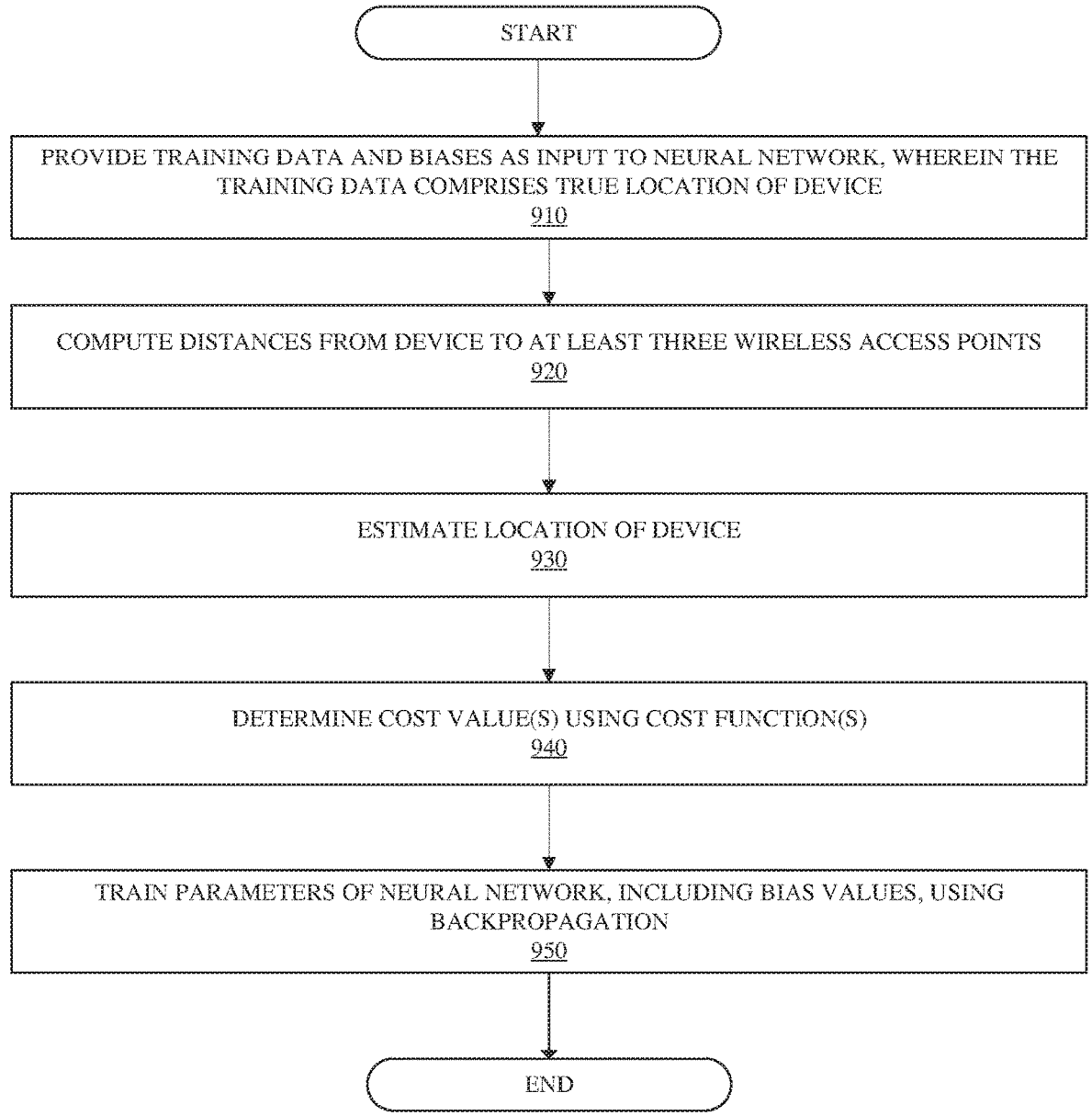
FIG. 9 illustrates an example of a third logic flow.

FIG. 9 illustrates an embodiment of a logic flow 900. The logic flow 900 may be representative of some or all of the operations executed by one or more embodiments described herein. For example, the logic flow 900 may be representative of some or all of the operations executed to train the neural network 104 to learn bias values for access points 110 and/or devices 120 using semi-supervised learning. Embodiments are not limited in this context.

As shown, the logic flow 900 begins at block 910, where training data 105 and bias values for one or more APs 110 and/or devices 120 are provided as input to the neural network 104. The training data 105 may include labels indicating the true location of one or more devices 120 in the environment at one or more time intervals. At block 920, distances from one or more devices 120 to a plurality of APs 110 are computed by the neural network 104. The computed distances may consider the bias values provided as input to the neural network 104. In one embodiment, the plurality of APs 110 include at least three APs 110. At block 930, the neural network 104 may estimate the location of the device 120. Equations 13 and 16-19 describe example operations used to estimate distances between a device 120 and three or more APs 110 and estimate the location of a device 120 based on the estimated distances. At block 940, one or more cost values for the neural network 104 are determined using one or more cost functions. An example cost function to compute cost values includes Equation 15 above. At block 950, the parameters of the neural network 104 are trained using backpropagation. The parameters trained may include the bias values, offsets, weights, and/or activations of the neural network 104.

Figure 10:
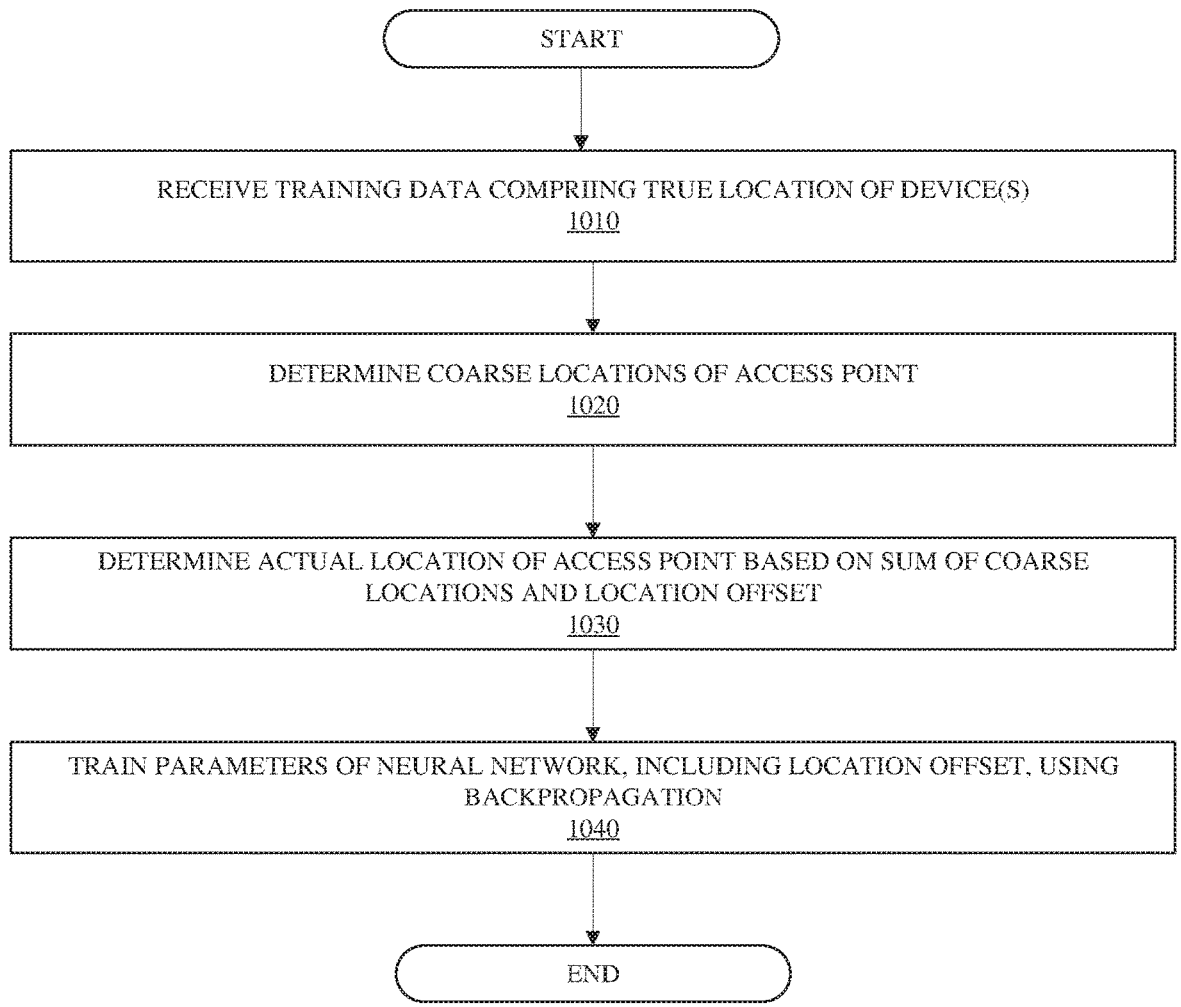
FIG. 10 illustrates an example of a fourth logic flow.

FIG. 10 illustrates an embodiment of a logic flow 1000. The logic flow 1000 may be representative of some or all of the operations executed by one or more embodiments described herein. For example, the logic flow 1000 may be representative of some or all of the operations executed to train the neural network 104 to estimate the locations of one or more APs 110. Embodiments are not limited in this context.

As shown, the logic flow 1000 begins at block 1010, where the neural network receives training data 105 as input. The training data 105 may include labels indicating the true location of at least one device 120 for one or more time intervals. At block 1020, the neural network 104 may determine a coarse location of one or more APs 110 at a plurality of time intervals. Equation 16 is an example of techniques to determine the coarse location of APs 110. At block 1030, the neural network 104 may determine the true location of the APs 110 based on the sum of coarse locations determined at block 1020 and a location offset. Equation 17 is an example of techniques to determine the actual location of APs 110. At block 1040, the parameters of the neural network 104 are trained using backpropagation and one or more cost functions. The parameters trained may include the bias values, offsets, weights, and/or activations of the neural network 104.

Figure 11:
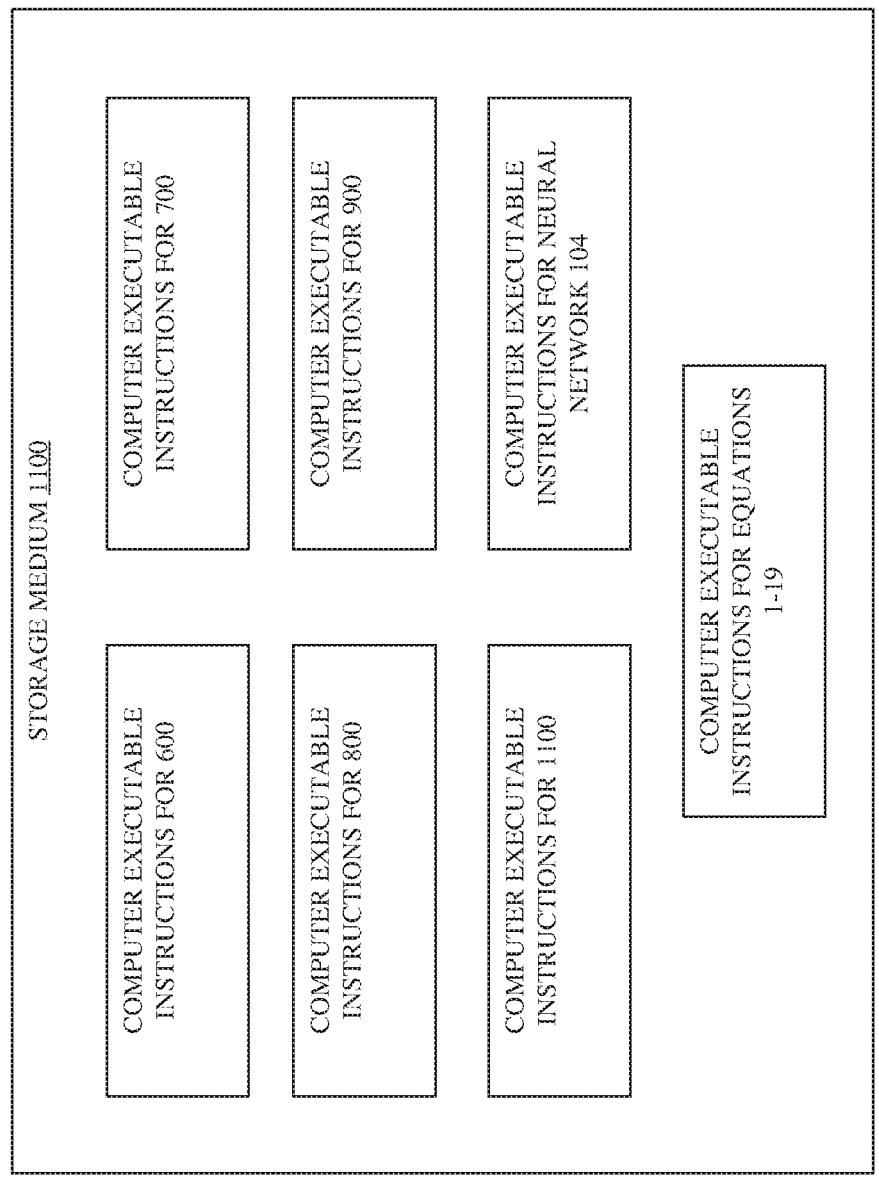
FIG. 11 illustrates an embodiment of a storage medium.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or more of logic flows or operations described herein, such as with respect to 600, 700, 800, 900, 1000 of FIGS. 6-10. Similarly, the storage medium 1100 may store computer-executable instructions for equations 1-19 above. The storage medium 1100 may further store computer-executable instructions for the neural network 104 (and constituent components, including any training, described herein). Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
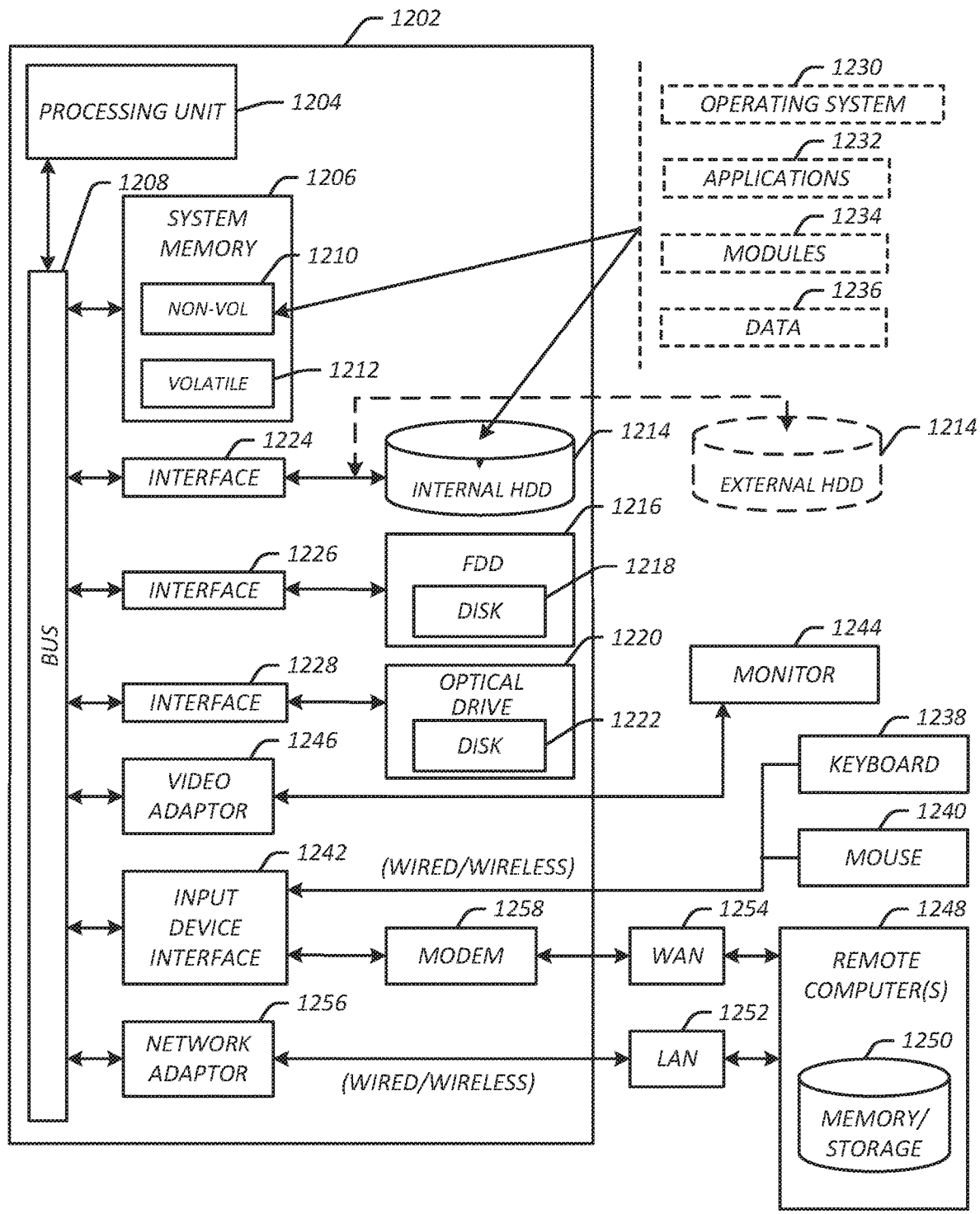
FIG. 12 illustrates an embodiment of a system.

FIG. 12 illustrates an embodiment of an exemplary computing architecture 1200 that may be suitable for implementing various embodiments as previously described. In various embodiments, the computing architecture 1200 may comprise or be implemented as part of an electronic device. In some embodiments, the computing architecture 1200 may be representative, for example, of a computer system that implements one or more components of system 100 of FIG. 1, such as the computing system 101, access points 110, and/or devices 120. The embodiments are not limited in this context. More generally, the computing architecture 1200 is configured to implement all logic, systems, logic flows, methods, equations, apparatuses, and functionality described herein and with reference to FIGS. 1-11.

As used in this application, the terms "system" and "component" and "module" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 (also referred to as a processor circuit) can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204. In at least one embodiment, the processing unit 1204 corresponds to the processor circuits 102-1, 102-2, and 102-3 of FIG. 1, while the memory 1206 corresponds to the memory 103-1, 103-2, and 103-3 of FIG. 1.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), bulk byte-addressable persistent memory (PMEM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a compact disc read-only memory (CD-ROM) or digital versatile disc (DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of FIGS. 1-9.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. In various embodiments, one or more migrations may occur via the networked environment. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 1202 family of standards, such as wireless devices operatively disposed in wireless communication (e.g., IEEE 1202.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1202.11x (a, b, g, n, etc.) to provide secure, reliable, fast wireless connectivity. A Wi-Fi network can be used to connect computers to each other, to the Internet, and to wire networks (which use IEEE 1202.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is an apparatus, comprising: a processor circuit; and a memory storing instructions which when executed by the processor circuit cause the processor circuit to: determine, by a neural network based on training data related to wireless signals exchanged by a device and a plurality of wireless access points in an environment, a respective distance between the device and each wireless access point of the plurality of wireless access points; receive location data related to a respective location of each wireless access point of the plurality of wireless access points; determine a geometric cost of the neural network based on a geometric cost function, the respective distances, and the received location data; and train a plurality of values of the neural network based on a backpropagation and the determined geometric cost.

Example 2 includes the subject matter of example 1, the geometric cost function to determine the geometric cost based on a two-dimensional coordinate of each wireless access point specified in the received location data, the respective distances, and a reliability value associated with each respective distance, the geometric cost function to comprise one or more of the following equations:

$$J_{geo}(t) = f(x_1(t), y_1(t), \hat{d}_1(t), \hat{r}_1(t), \ldots, x_K(t), y_K(t), \hat{d}_K(t), \hat{r}_K(t));$$

$$J_{geo}(t) = \sum_{k=1}^{K} \left( \sqrt{(\hat{x}(t) - x_k(t))^2 + (\hat{y}(t) - y_k(t))^2} - \hat{d}_k(t) \right)^2; \text{ and}$$

$$J_{geo}(t) = \sum_{k=1}^{K} \hat{r}_k(t) \left( \sqrt{(\hat{x}(t) - x_k(t))^2 + (\hat{y}(t) - y_k(t))^2} - \hat{d}_k(t) \right)^2.$$

Example 3 includes the subject matter of example 2, the geometric cost to correspond to a first time interval of a plurality of time intervals, a total geometric cost of the neural network to correspond to the geometric cost for the plurality of time intervals, the training data collected over the plurality of time intervals, the total geometric cost computed according to the following equation:

$$J_{geo} = \sum_{t=1}^{T} J_{geo}(t).$$

Example 4 includes the subject matter of example 3, the memory storing instructions which when executed by the processor circuit cause the processor circuit to: determine a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals, the difference cost function to comprise:

$$J_{diff} = \sum_{t=2}^{T} (\hat{x}(t) - \hat{x}(t-1))^2 + (\hat{y}(t) - \hat{y}(t-1))^2.$$

Example 5 includes the subject matter of example 4, the memory storing instructions which when executed by the processor circuit cause the processor circuit to: determine a velocity cost of the neural network based on a velocity cost function, the velocity cost function to determine the velocity cost based on a velocity of the device at the first time interval and a velocity of the device at the second time interval, the velocity cost function to comprise:

$$J_{velo} = \sum_{t=3}^{T} (\hat{v}_x(t) - \hat{v}_x(t-1))^2 + (\hat{v}_y(t) - \hat{v}_y(t-1))^2.$$

Example 6 includes the subject matter of example 5, the memory storing instructions which when executed by the processor circuit cause the processor circuit to: determine a distance cost of the neural network based on a distance cost function, the distance cost function to determine the distance cost based on an estimated distance between the device and each wireless access point of the plurality of wireless access points, the estimated distances to comprise distances estimated at each time interval based on the 802.11mc protocol, the plurality of wireless access points to comprise at least three wireless access points, the distance cost function to comprise:

$$J_{dist}(t) = \sum_{k=1}^{K} \left( \hat{d}_k(t) - \hat{d}_{k,guide}(t) \right)^2.$$

Example 7 includes the subject matter of example 1, the plurality of values of the neural network to comprise: (i) weight values, (ii) activation values, and (iii) bias values, the training data related to wireless signals to comprise one or more of: (i) received signal strength (RSS) of the wireless signals, (ii) channel state information (CSI) of the wireless signals, and (iii) round-trip time (RTT) of the wireless signals, the training data related to wireless signals to comprise vectors provided as input to the neural network.

Example 8 includes the subject matter of example 1, the memory storing instructions which when executed by the processor circuit cause the processor circuit to: determine a total cost of the neural network based on a total cost function, the total cost function to determine the total cost based on the geometric cost, a difference cost of the neural network, a velocity cost of the neural network, and a distance cost of the neural network, the total cost function to comprise:

$$J_{loc} = \sum_{t=1}^{T} (\hat{x}(t) - \hat{x}_{guide}(t))^2 + \left( \hat{y}(t) - \hat{y}_{guide}(t) \right)^2.$$

Example 9 includes the subject matter of example 8, the memory storing instructions which when executed by the processor circuit cause the processor circuit to: provide a bias vector as input to the neural network, the bias vector to describe a bias of at least one of: (i) the device, and (ii) one of the plurality of wireless access points; and determine a location cost of the neural network based on a location cost function, the location cost function to determine the location cost based on actual location data of the device in the training data, wherein the bias vector is trained based on the backpropagation, the total cost, and the location cost, the location cost function to comprise:

$$J_{loc} = \Sigma_{t=1}^{T} (\hat{x}(t) - \hat{x}_{guide}(t))^2 + (\hat{y}(t) - \hat{y}_{guide}(t))^2.$$

Example 10 includes the subject matter of example 8, the memory storing instructions which when executed by the processor circuit cause the processor circuit to: determine, by the neural network based on the training data, an estimated location of a first wireless access point of the plurality of wireless access points; and determine an actual location of the first wireless access point based on actual location data of the device in the training data, the total cost, and an offset value.

Example 11 is a non-transitory computer-readable storage medium storing instructions which when executed by a processor circuit cause the processor circuit to: determine, by a neural network based on training data related to wireless signals exchanged by a device and a plurality of wireless access points in an environment, a respective distance between the device and each wireless access point of the plurality of wireless access points; receive location data related to a respective location of each wireless access point of the plurality of wireless access points; determine a geometric cost of the neural network based on a geometric cost function, the respective distances, and the received location data; and train a plurality of values of the neural network based on a backpropagation and the determined geometric cost.

Example 12 includes the subject matter of example 11, the geometric cost function to determine the geometric cost based on a two-dimensional coordinate of each wireless access point specified in the received location data, the respective distances, and a reliability value associated with each respective distance, the geometric cost function to comprise one or more of the following equations:

$$J_{geo}(t) = f(x_1(t), y_1(t), \hat{d}_1(t), \hat{r}_1(t), \ldots, x_K(t), y_K(t), \hat{d}_K(t), \hat{r}_K(t));$$

$$J_{geo}(t) = \sum_{k=1}^{K} \left( \sqrt{(\hat{x}(t) - x_k(t))^2 + (\hat{y}(t) - y_k(t))^2} - \hat{d}_k(t) \right)^2; \text{ and}$$

$$J_{geo}(t) = \sum_{k=1}^{K} \hat{r}_k(t) \left( \sqrt{(\hat{x}(t) - x_k(t))^2 + (\hat{y}(t) - y_k(t))^2} - \hat{d}_k(t) \right)^2.$$

Example 13 includes the subject matter of example 12, the geometric cost to correspond to a first time interval of a plurality of time intervals, a total geometric cost of the neural network to correspond to the geometric cost for the plurality of time intervals, the training data collected over the plurality of time intervals, the total geometric cost computed according to the following equation:

$$J_{geo} = \sum_{t=1}^{T} J_{geo}(t).$$

Example 14 includes the subject matter of example 13, storing instructions which when executed by the processor circuit cause the processor circuit to: determine a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals the difference cost function to comprise:

$$J_{diff} = \sum_{t=2}^{T} (\hat{x}(t) - \hat{x}(t-1))^2 + (\hat{y}(t) - \hat{y}(t-1))^2.$$

Example 15 includes the subject matter of example 14, storing instructions which when executed by the processor circuit cause the processor circuit to: determine a velocity cost of the neural network based on a velocity cost function, the velocity cost function to determine the velocity cost based on a velocity of the device at the first time interval and a velocity of the device at the second time interval, the velocity cost function to comprise:

$$J_{velo} = \sum_{t=3}^{T} (\hat{v}_x(t) - \hat{v}_x(t-1))^2 + (\hat{v}_y(t) - \hat{v}_y(t-1))^2.$$

Example 16 includes the subject matter of example 15, storing instructions which when executed by the processor circuit cause the processor circuit to: determine a distance cost of the neural network based on a distance cost function, the distance cost function to determine the distance cost based on an estimated distance between the device and each wireless access point of the plurality of wireless access points, the estimated distances to comprise distances estimated at each time interval based on the 802.11mc protocol, the plurality of wireless access points to comprise at least three wireless access points, the distance cost function to comprise:

$$J_{dist}(t) = \sum_{k=1}^{K} (\hat{d}_k(t) - \hat{d}_{k,guide}(t))^2.$$

Example 17 includes the subject matter of example 11, the plurality of values of the neural network comprising: (i) weight values, (ii) activation values, and (iii) bias values, the training data related to wireless signals comprising one or more of: (i) received signal strength (RSS) of the wireless signals, (ii) channel state information (CSI) of the wireless signals, and (iii) round-trip time (RTT) of the wireless signals, the training data related to wireless signals comprising vectors provided as input to the neural network.

Example 18 includes the subject matter of example 11, storing instructions which when executed by the processor circuit cause the processor circuit to: determine a total cost of the neural network based on a total cost function, the total cost function to determine the total cost based on the geometric cost, a difference cost of the neural network, a velocity cost of the neural network, and a distance cost of the neural network, the total cost function to comprise:

$$J = J_{geo} + J_{diff} + J_{velo} + J_{dist}.$$

Example 19 includes the subject matter of example 18, storing instructions which when executed by the processor circuit cause the processor circuit to: provide a bias vector as input to the neural network, the bias vector to describe a bias of at least one of: (i) the device, and (ii) one of the plurality of wireless access points; and determine a location cost of the neural network based on a location cost function, the location cost function to determine the location cost based on actual location data of the device in the training data, wherein the bias vector is trained based on the backpropagation, the total cost, and the location cost, the location cost function to comprise:

$$J_{loc} = \sum_{t=1}^{T} (\hat{x}(t) - \hat{x}_{guide}(t))^2 + (\hat{y}(t) - \hat{y}_{guide}(t))^2.$$

Example 20 includes the subject matter of example 18, storing instructions which when executed by the processor circuit cause the processor circuit to: determine, by the neural network based on the training data, an estimated location of a first wireless access point of the plurality of wireless access points; and determine an actual location of the first wireless access point based on actual location data of the device in the training data, the total cost, and an offset value.

Example 21 is a method, comprising: determining, by a neural network executing on a processor based on training data related to wireless signals exchanged by a device and a plurality of wireless access points in an environment, a respective distance between the device and each wireless access point of the plurality of wireless access points; receiving location data related to a respective location of each wireless access point of the plurality of wireless access points; determining a geometric cost of the neural network based on a geometric cost function, the respective distances, and the received location data; and training a plurality of values of the neural network based on a backpropagation and the determined geometric cost.

Example 22 includes the subject matter of example 21, the geometric cost function to determine the geometric cost based on a two-dimensional coordinate of each wireless access point specified in the received location data, the respective distances, and a reliability value associated with each respective distance, the geometric cost function to comprise one or more of the following equations:

$$J_{geo}(t) = f(x_1(t), y_1(t), \hat{d}_1(t), \hat{r}_1(t), \ldots, x_K(t), y_K(t), \hat{d}_K(t), \hat{r}_K(t));$$

$$J_{geo}(t) = \sum_{k=1}^{K} \left( \sqrt{(\hat{x}(t) - x_k(t))^2 + (\hat{y}(t) - y_k(t))^2} - \hat{d}_k(t) \right)^2; \text{ and}$$

$$J_{geo}(t) = \sum_{k=1}^{K} \hat{r}_k(t) \left( \sqrt{(\hat{x}(t) - x_k(t))^2 + (\hat{y}(t) - y_k(t))^2} - \hat{d}_k(t) \right)^2.$$

Example 23 includes the subject matter of example 22, the geometric cost to correspond to a first time interval of a plurality of time intervals, a total geometric cost of the neural network to correspond to the geometric cost for the plurality of time intervals, the training data collected over the plurality of time intervals, the total geometric cost computed according to the following equation:

$$J_{geo} = \sum_{t=1}^{T} J_{geo}(t).$$

Example 24 includes the subject matter of example 23, further comprising: determining a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals, the difference cost function to comprise:

$$J_{diff} = \sum_{t=2}^{T} (\hat{x}(t) - \hat{x}(t-1))^2 + (\hat{y}(t) - \hat{y}(t-1))^2.$$

Example 25 includes the subject matter of example 24, further comprising: determining a velocity cost of the neural network based on a velocity cost function, the velocity cost function to determine the velocity cost based on a velocity of the device at the first time interval and a velocity of the device at the second time interval, the velocity cost function to comprise:

$$J_{velo} = \sum_{t=3}^{T} (\hat{v}_x(t) - \hat{v}_x(t-1))^2 + (\hat{v}_y(t) - \hat{v}_y(t-1))^2.$$

Example 26 includes the subject matter of example 25, further comprising: determining a distance cost of the neural network based on a distance cost function, the distance cost function to determine the distance cost based on an estimated distance between the device and each wireless access point of the plurality of wireless access points, the estimated distances to comprise distances estimated at each time interval based on the 802.11mc protocol, the plurality of wireless access points comprising at least three wireless access points, the distance cost function to comprise:

$$J_{dist}(t) = \sum_{k=1}^{K} (\hat{d}_k(t) - \hat{d}_{k,guide}(t))^2.$$

Example 27 includes the subject matter of example 21, the plurality of values of the neural network to comprise: (i) weight values, (ii) activation values, and (iii) bias values, the training data related to wireless signals to comprise one or more of: (i) received signal strength (RSS) of the wireless signals, (ii) channel state information (CSI) of the wireless signals, and (iii) round-trip time (RTT) of the wireless signals, the training data related to wireless signals to comprise vectors provided as input to the neural network.

Example 28 includes the method of claim 21, further comprising: determining a total cost of the neural network based on a total cost function, the total cost function to determine the total cost based on the geometric cost, a difference cost of the neural network, a velocity cost of the neural network, and a distance cost of the neural network, the total cost function to comprise:

$$J = J_{geo} + J_{diff} + J_{velo} + J_{dist}.$$

Example 29 includes the subject matter of example 28, further comprising: providing a bias vector as input to the neural network, the bias vector to describe a bias of at least one of: (i) the device, and (ii) one of the plurality of wireless access points; and determining a location cost of the neural network based on a location cost function, the location cost function to determine the location cost based on actual location data of the device in the training data, wherein the bias vector is trained based on the backpropagation, the total cost, and the location cost, the location cost function to comprise:

$$J_{loc} = \sum_{t=1}^{T} (\hat{x}(t) - \hat{x}_{guide}(t))^2 + (\hat{y}(t) - \hat{y}_{guide}(t))^2.$$

Example 30 includes the subject matter of example 28, further comprising: determining, by the neural network based on the training data, an estimated location of a first wireless access point of the plurality of wireless access points; and determining an actual location of the first wireless access point based on actual location data of the device in the training data, the total cost, and an offset value.

Example 31 is an apparatus, comprising: means for determining, by a neural network based on training data related to wireless signals exchanged by a device and a plurality of wireless access points in an environment, a respective distance between the device and each wireless access point of the plurality of wireless access points; means for receiving location data related to a respective location of each wireless access point of the plurality of wireless access points; means for determining a geometric cost of the neural network based on a geometric cost function, the respective distances, and the received location data; and means for training a plurality of values of the neural network based on a backpropagation and the determined geometric cost.

Example 32 includes the subject matter of example 31, the geometric cost function to determine the geometric cost based on a two-dimensional coordinate of each wireless access point specified in the received location data, the respective distances, and a reliability value associated with each respective distance, the geometric cost function to comprise one or more of the following equations:

$$J_{geo}(t) = f(x_1(t), y_1(t), \hat{d}_1(t), \hat{r}_1(t), \ldots, x_K(t), y_K(t), \hat{d}_K(t), \hat{r}_K(t));$$

$$J_{geo}(t) = \sum_{k=1}^{K}\left(\sqrt{(\hat{x}(t)-x_k(t))^2 + (\hat{y}(t)-y_k(t))^2} - \hat{d}_k(t)\right)^2; \text{ and}$$

$$J_{geo}(t) = \sum_{k=1}^{K}\hat{r}_k(t)\left(\sqrt{(\hat{x}(t)-x_k(t))^2 + (\hat{y}(t)-y_k(t))^2} - \hat{d}_k(t)\right)^2.$$

Example 33 includes the subject matter of example 32, the geometric cost to correspond to a first time interval of a plurality of time intervals, a total geometric cost of the neural network to correspond to the geometric cost for the plurality of time intervals, the training data collected over the plurality of time intervals, the total geometric cost computed according to the following equation:

$$J_{geo} = \sum_{t=1}^{T} J_{geo}(t).$$

Example 34 includes the subject matter of example 33, further comprising: means for determining a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals, the difference cost function to comprise:

$$J_{diff} = \sum_{t=2}^{T}(\hat{x}(t)-\hat{x}(t-1))^2 + (\hat{y}(t)-\hat{y}(t-1))^2.$$

Example 35 includes the subject matter of example 34, further comprising: means for determining a velocity cost of the neural network based on a velocity cost function, the velocity cost function to determine the velocity cost based on a velocity of the device at the first time interval and a velocity of the device at the second time interval, the velocity cost function to comprise:

$$J_{velo} = \sum_{t=3}^{T}(\hat{v}_x(t)-\hat{v}_x(t-1))^2 + (\hat{v}_y(t)-\hat{v}_y(t-1))^2.$$

Example 36 includes the subject matter of example 35, further comprising: means for determining a distance cost of the neural network based on a distance cost function, the distance cost function to determine the distance cost based on an estimated distance between the device and each wireless access point of the plurality of wireless access points, the estimated distances to comprise distances estimated at each time interval based on the 802.11mc protocol, the plurality of wireless access points to comprise at least three wireless access points, the distance cost function to comprise:

$$J_{dist}(t) = \sum_{k=1}^{K}\left(\hat{d}_k(t) - \hat{d}_{k,guide}(t)\right)^2.$$

Example 37 includes the subject matter of example 31, the plurality of values of the neural network to comprise: (i) weight values, (ii) activation values, and (iii) bias values, the training data related to wireless signals to comprise one or more of: (i) received signal strength (RSS) of the wireless signals, (ii) channel state information (CSI) of the wireless signals, and (iii) round-trip time (RTT) of the wireless signals, the training data related to wireless signals to comprise vectors provided as input to the neural network.

Example 38 includes the subject matter of example 31, further comprising: means for determining a total cost of the neural network based on a total cost function, the total cost function to determine the total cost based on the geometric cost, a difference cost of the neural network, a velocity cost of the neural network, and a distance cost of the neural network, the total cost function to comprise:

$$J=J_{geo}+J_{diff}+J_{velo}+J_{dist}.$$

Example 39 includes the subject matter of example 38, further comprising: means for providing a bias vector as input to the neural network, the bias vector to describe a bias of at least one of: (i) the device, and (ii) one of the plurality of wireless access points; and means for determining a location cost of the neural network based on a location cost function, the location cost function to determine the location cost based on actual location data of the device in the training data, wherein the bias vector is trained based on the backpropagation, the total cost, and the location cost, the location cost function to comprise:

$$J_{loc} = \sum_{t=1}^{T}(\hat{x}(t) - \hat{x}_{guide}(t))^2 + (\hat{y}(t) - \hat{y}_{guide}(t))^2.$$

Example 40 includes the subject matter of example 38, further comprising: means for determining, by the neural network based on the training data, an estimated location of a first wireless access point of the plurality of wireless access points; and means for determining an actual location of the first wireless access point based on actual location data of the device in the training data, the total cost, and an offset value.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a processor circuit; and
   memory storing instructions which when executed by the processor circuit cause the processor circuit to:
   determine, by a neural network based on training data related to wireless signals exchanged by a device and a plurality of wireless access points in an environment, a respective distance between the device and each wireless access point of the plurality of wireless access points;
   receive location data related to a respective location of each wireless access point of the plurality of wireless access points;
   determine a geometric cost of the neural network based on a geometric cost function, the respective distances, and the received location data, the geometric cost function to determine the geometric cost based on a two-dimensional coordinate of each wireless access point specified in the received location data, the respective distances, and a reliability value associated with each respective distance, the reliability value to comprise a standard deviation value; and train a plurality of values of the neural network based on a backpropagation and the determined geometric cost.

2. The apparatus of claim 1, the geometric cost to correspond to a first time interval of a plurality of time intervals, a total geometric cost of the neural network to correspond to the geometric cost for the plurality of time intervals, the training data collected over the plurality of time intervals.

3. The apparatus of claim 2, the memory storing instructions which when executed by the processor circuit cause the processor circuit to:
determine a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals.

4. The apparatus of claim 3, the memory storing instructions which when executed by the processor circuit cause the processor circuit to:
determine a velocity cost of the neural network based on a velocity cost function, the velocity cost function to determine the velocity cost based on a velocity of the device at the first time interval and a velocity of the device at the second time interval.

5. The apparatus of claim 4, the memory storing instructions which when executed by the processor circuit cause the processor circuit to:
determine a distance cost of the neural network based on a distance cost function, the distance cost function to determine the distance cost based on an estimated distance between the device and each wireless access point of the plurality of wireless access points, the estimated distances to comprise distances estimated at each time interval based on the 802.11mc protocol, the plurality of wireless access points to comprise at least three wireless access points.

6. The apparatus of claim 1, the plurality of values of the neural network to comprise: (i) weight values, (ii) activation values, and (iii) bias values, the training data related to wireless signals to comprise one or more of: (i) received signal strength (RSS) of the wireless signals, (ii) channel state information (CSI) of the wireless signals, and (iii) round-trip time (RTT) of the wireless signals, the training data related to wireless signals to comprise vectors provided as input to the neural network.

7. The apparatus of claim 1, the memory storing instructions which when executed by the processor circuit cause the processor circuit to:
determine a total cost of the neural network based on a total cost function, the total cost function to determine the total cost based on the geometric cost, a difference cost of the neural network, a velocity cost of the neural network, and a distance cost of the neural network.

8. The apparatus of claim 7, the memory storing instructions which when executed by the processor circuit cause the processor circuit to:
provide a bias vector as input to the neural network, the bias vector to describe a bias of at least one of: (i) the device, and (ii) one of the plurality of wireless access points; and
determine a location cost of the neural network based on a location cost function, the location cost function to determine the location cost based on actual location data of the device in the training data, wherein the bias vector is trained based on the backpropagation, the total cost, and the location cost.

9. The apparatus of claim 7, the memory storing instructions which when executed by the processor circuit cause the processor circuit to:
determine, by the neural network based on the training data, an estimated location of a first wireless access point of the plurality of wireless access points; and
determine an actual location of the first wireless access point based on actual location data of the device in the training data, the total cost, and an offset value.

10. A non-transitory computer-readable storage medium storing instructions which when executed by a processor circuit cause the processor circuit to:
determine, by a neural network based on training data related to wireless signals exchanged by a device and a plurality of wireless access points in an environment, a respective distance between the device and each wireless access point of the plurality of wireless access points;
receive location data related to a respective location of each wireless access point of the plurality of wireless access points;
determine a geometric cost of the neural network based on a geometric cost function, the respective distances, and the received location data, the geometric cost function to determine the geometric cost based on a two-dimensional coordinate of each wireless access point specified in the received location data, the respective distances, and a reliability value associated with each respective distance, the reliability value to comprise a standard deviation value; and
train a plurality of values of the neural network based on a backpropagation and the determined geometric cost.

11. The computer-readable storage medium of claim 10, the geometric cost to correspond to a first time interval of a plurality of time intervals, a total geometric cost of the neural network to correspond to the geometric cost for the plurality of time intervals, the training data collected over the plurality of time intervals.

12. The computer-readable storage medium of claim 11, storing instructions which when executed by the processor circuit cause the processor circuit to:
determine a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals.

13. The computer-readable storage medium of claim 12, storing instructions which when executed by the processor circuit cause the processor circuit to:
determine a velocity cost of the neural network based on a velocity cost function, the velocity cost function to determine the velocity cost based on a velocity of the device at the first time interval and a velocity of the device at the second time interval, the plurality of wireless access points to comprise at least three wireless access points.

14. A method, comprising:
determining, by a neural network executing on a processor based on training data related to wireless signals exchanged by a device and a plurality of wireless access points in an environment, a respective distance between the device and each wireless access point of the plurality of wireless access points;

receiving location data related to a respective location of each wireless access point of the plurality of wireless access points;

determining a geometric cost of the neural network based on a geometric cost function, the respective distances, and the received location data, the geometric cost function to determine the geometric cost based on a two-dimensional coordinate of each wireless access point specified in the received location data, the respective distances, and a reliability value associated with each respective distance, the reliability value to comprise a standard deviation value; and training a plurality of values of the neural network based on a backpropagation and the determined geometric cost.

15. The method of claim 14, the geometric cost to correspond to a first time interval of a plurality of time intervals, a total geometric cost of the neural network to correspond to the geometric cost for the plurality of time intervals, the training data collected over the plurality of time intervals.

16. The method of claim 15, further comprising:

determining a difference cost of the neural network based on a difference cost function, the difference cost function to determine the difference cost based on the respective distances at the first time interval and a respective distance between the device and each wireless access point of the plurality of wireless access points determined by the neural network at a second time interval of the plurality of time intervals, the first and second time intervals consecutive time intervals.

17. The method of claim 16, further comprising:

determining a velocity cost of the neural network based on a velocity cost function, the velocity cost function to determine the velocity cost based on a velocity of the device at the first time interval and a velocity of the device at the second time interval, the plurality of wireless access points comprising at least three wireless access points.

* * * * *